United States Patent [19]

Seto et al.

[11] Patent Number: 5,073,957
[45] Date of Patent: Dec. 17, 1991

[54] GRAPHIC EDITING SYSTEM

[75] Inventors: Kunio Seto, Inagi; Chizuko Yamamoto, Fuchu; Kiyoshi Watanabe, Kawasaki, all of Japan

[73] Assignee: Canon Kabushiki Kaisha, Tokyo, Japan

[21] Appl. No.: 242,138

[22] Filed: Sep. 9, 1988

[30] Foreign Application Priority Data

Sep. 13, 1987 [JP] Japan .................. 62-228711
Sep. 13, 1987 [JP] Japan .................. 62-228712
Sep. 13, 1987 [JP] Japan .................. 62-228713

[51] Int. Cl.$^5$ ............................. G06K 9/00
[52] U.S. Cl. ......................... 382/22; 382/16; 382/44; 382/54; 382/21
[58] Field of Search ............ 382/22, 60, 21, 54, 382/44

[56] References Cited

U.S. PATENT DOCUMENTS 4,442,542 4/1984 Lin et al. ............................... 382/8
4,618,990 10/1986 Sieb, Jr. et al. ...................... 382/22

Primary Examiner—David K. Moore
Assistant Examiner—Daniel Santos
Attorney, Agent, or Firm—Fitzpatrick, Cella, Harper & Scinto

[57] ABSTRACT

A system that obtains the internal contour of a pattern without changing the ratio of the image area to the non-image area in the original image, by taking logic products between the original pattern and inverted patterns obtained by moving the original pattern in lateral and vertical directions by a small amount.

12 Claims, 18 Drawing Sheets

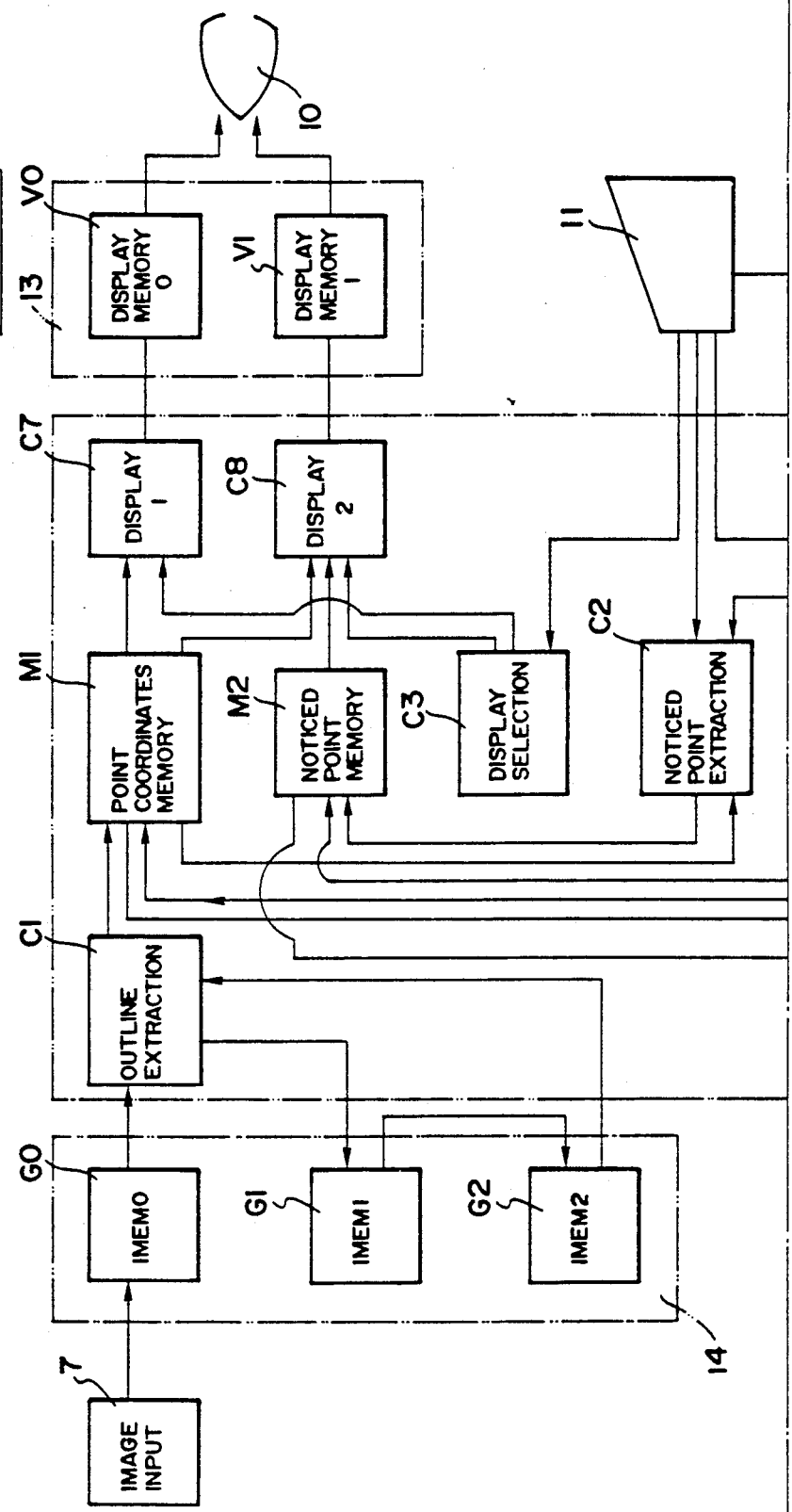

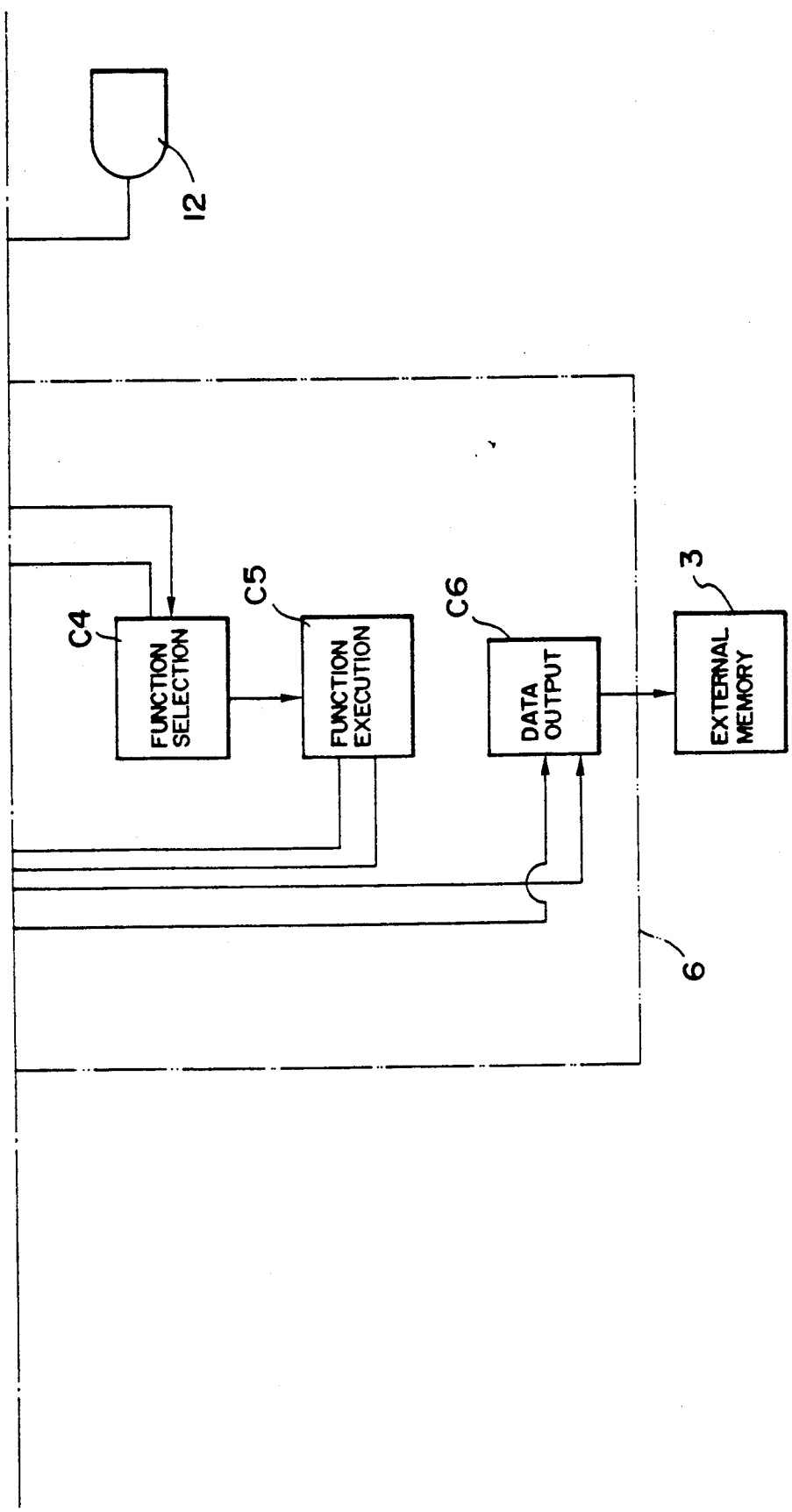

STPOLY
| spno | effcnt |
|------|--------|
FIG. 4-1
STDATA
| stno | pgno |
|------|------|
| flag | |
| pos | |
| prno | nxno |
FIG. 4-2
stpoly
| | | |
|---|---|---|
| [0] | 0 | a |
| [1] | a | b − a |
| [2] | b | c − b |
| [3] | c | d − c |
| [4] | −1 | |
FIG. 4-4
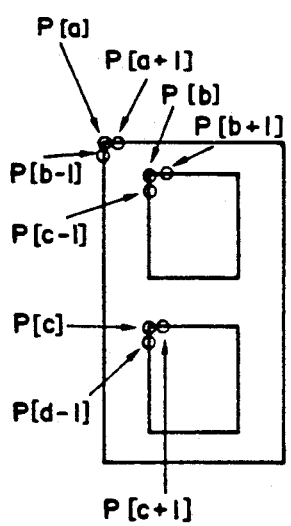
FIG. 4-3
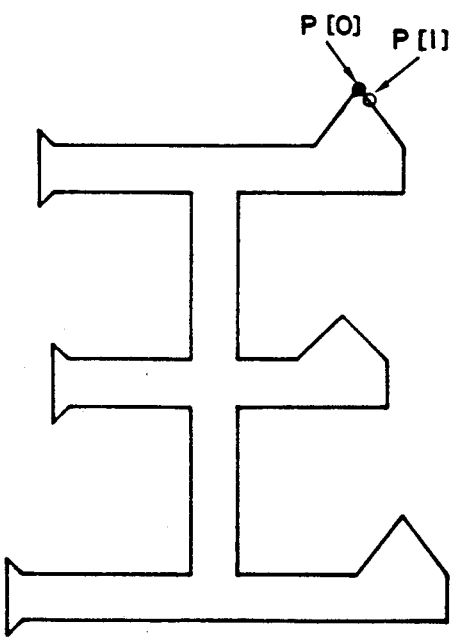
stdata
| | | |
|---|---|---|
| [0] | −1 | 0 |
| | 0 | |
| | P0(x) | P0(y) |
| | a−1 | 1 |
| [1] | −1 | 0 |
| | 0 | |
| | P1(x) | P1(y) |
| | 0 | 2 |
| [a−1] | −1 | 0 |
| | 0 | |
| | Pa−1(x) | Pa−1(y) |
| | a−2 | 0 |
| [a] | −1 | 1 |
| | 0 | |
| | Pa(x) | Pa(y) |
| | b−1 | a+1 |
| [a+1] | −1 | 1 |
| | 0 | |
| | Pa+1(x) | Pa+1(y) |
| | a | a+2 |
| [d−2] | −1 | 3 |
| | 0 | |
| | Pd−2(x) | Pd−2(y) |
| | d−3 | d−1 |
| [d−1] | −1 | 3 |
| | 0 | |
| | Pd−1(x) | Pd−1(y) |
| | d−2 | c |
FIG. 4-5

GRAPHIC EDITING SYSTEM

BACKGROUND OF THE INVENTION

1. Field o the Invention

The present invention relates to a graphic editing system for electronic editing of documents and graphic patterns.

2. Related Background Art

In electronic editing systems for documents and graphics, it is often necessary to form the edge of the original image pattern in order to emphasize the effect of the characters and patterns, or to extract the contour of a bit map pattern. A simple method for extracting the contour of a bit map pattern consists of preparing a pattern by taking a logic sum of patterns obtained by moving the original pattern in the vertical and lateral directions by a predetermined amount of bits, and taking a logic exclusive sum of said pattern and the original pattern, thus obtaining the edge of the original pattern.

However such method extracts the external edge (boundary with the non-image area) of the original pattern, so that the ratio of the image area to the non-image area may become different from that of the original image.

In recent years there have been developed electronic phototypesetting systems and electronic editing systems for documents and graphics, utilizing work stations relying on advanced LSI's and laser beam printers capable of reproducing bit map image data of a high resolution. Such systems are required to have various character and graphic patterns, namely various characters, various font styles and various output sizes, and, for achieving such objective inexpensively, there have been proposed, for example, run-length compression of bit pattern and vector encoding of character patterns. The vector encoding is recently getting popularity, as the above-mentioned requirement is difficult to satisfy if the pattern is given by a bit pattern, regardless of the method of data compression. However, for achieving a beautiful reproduced image and a sufficiently high degree of compression in the vector encoding, the encoding requires significant work and aesthetic (not simply mathematical) precision. For achieving the above-mentioned requirement, editing of vector data is usually conducted with an editing apparatus for graphic patterns.

The conventional systems, however, are simply capable of displaying the data under editing but are incapable of displaying the original data. Consequently the operator is unable to identify the fidelity of the data under editing, in comparison with the original data, so that the editing operation has required considerable skill and has been inefficient in time.

Stated differently, the above-mentioned requirement is incompatible with the work required therefor. Consequently, if the emphasis is given to said requirement, it is customary to draw the original pattern in a large size on a sheet of paper or film and to determine the coordinates of representative points with a tablet or a digitizer. On the other hand, if emphasis is given to the saving of work at encoding, there is proposed a method of A/D converting the original analog pattern for example with a scanning line sensor, then extract the contour and select the characteristic points on the contour with a certain analysis algorithm (Japanese Laid-open Patent No. 58-81383).

However the image input operation with a tablet or a digitizer requires tremendous work, and the precision of the operation is unstable, depending greatly on the quality of the original image and the skill of the operator.

On the other hand, the latter method utilizing A/D conversion and automatic analysis is also associated with the following serious drawbacks:

1. It is not possible to obtain a beautiful reproduced image or a sufficient level of compression if the automatic analyzing algorithm is not complete;

2. An error of at least 2 dots (1 dot at each side of the contour of a certain width) is unavoidable in the thickness of the contour, due to the binary threshold value of the sensor used in the A/D conversion;

3. It is necessary to refine the original analog pattern in order to obtain satisfactory results in the items 1 and 2. This means, in practice, the use of a sufficiently large pattern with sufficiently shaped edges and contours, and the preparation of such pattern may involve significant work which is equivalent to or larger than that required for the input with the digitizer;

4. The original form may be partly or significantly lost if the error is removed as noise for reducing the work in the item 3. For example, in a character "  " (which is pronounced as "ke" and means "hair"), the delicately inclined line appearing in the horizontal stroke may be mistaken as a simple horizontal line, or a curved line with a very small curvature may be mistaken as a linear edge.

Therefore, as a practical compromise, the result of the automatic analysis, which in fact performs about 70% of the work actually needed, is further finished with a separate vector pattern editing tool.

In this manner the delicate part, that cannot be automatically analyzied, of the pattern to be encoded, has to be subjected to repeated editing.

SUMMARY OF THE INVENTION

In consideration of the foregoing, an object of the present invention is to provide a method of forming the edge of an original pattern by forming the logic product of the original pattern and inverted patterns of the patterns obtained by shifting the original pattern in the vertical and lateral directions respectively by one dot, thereby extracting the internal edge (boundary of image area of the original pattern) without varying the ratio of the image area to the non-image area of the original pattern.

Another object of the present invention is to provide a graphic editing system capable of displaying not only the data under processing but also the original data, thereby enabling to easily identify the fidelity of the data under editing in comparison with the original data and to improve the efficiency of the editing work.

Still another object of the present invention is to provide a graphic editing system provided with memory means for storing a group of coordinates of points representing the contour; display means for displaying said group of coordinates of points; extraction means for extracting plural feature points from said group of coordinates; and means for correlating said group of coordinates of the points representing said contour with the group of said feature points.

Still another object of the present invention is to provide a graphic editing system which does not rely on the coordinates of the points on the contour of limited precision but relies on the connection of points as a pattern, or the form of contour, thereby enabling the start of the final editing operation immediately after automatic input and A/D conversion.

BRIEF DESCRIPTION OF THE DRAWINGS

FIGS. 2-1 to 2-4 and 3 are a view showing the principle and a flow chart, for extracting only the bits of outline;

FIGS. 4-1 to 4-5 are views showing a structure for storing the group of coordinates of the points representing the outline;

FIG. 5 is a flow chart for displaying the group of coordinates of the points representing the outline;

DETAILED DESCRIPTION OF THE PREFERRED EMBODIMENTS

Now the graphic editing apparatus of the present invention will be clarified in detail by an embodiment thereof shown in the attached drawings.

Figure 1:
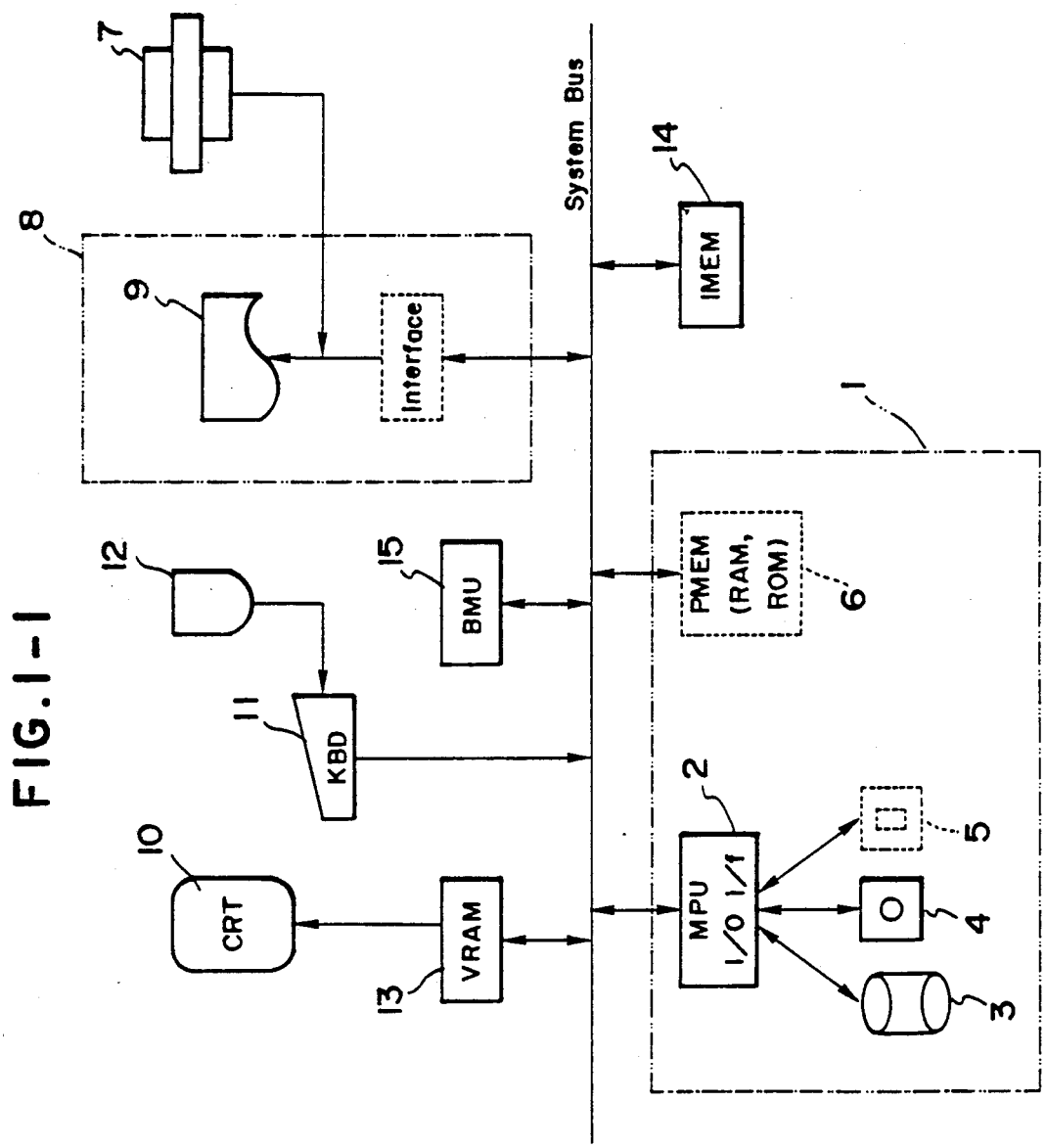
FIGS. 1-1 and 1-2 are block diagrams of a graphic editing system embodying the present invention.

FIG. 1-1 is a block diagram of the graphic editing apparatus embodying the present invention. In the present invention, the graphic patterns include characters and other image patterns. The functions of the present invention may be achieved by a system composed of plural equipment as will be shown in the following embodiment, or by a single equipment. In FIG. 1-1 there are shown:

a control unit 1, provided with a microcomputer (MPU) 2; an internal memory 6 composed of a random access memory (RAM) and a read-only memory (ROM); and external memories 3, 4, 5 composed of rigid disks, floppy disks, and cartridge disks;

an image input device 7, composed of an original reader for A/D conversion of an image placed on a support table by means of an image sensor, such as CCD, to generate electrical signals;

an image output unit 8, composed of a high-speed printer 9, such as a laser beam printer, for image recording on a recording material according to electrical signals;

a cathode ray tube (CRT) 10 for displaying control information of the apparatus and constituting an image processing display unit of the present invention;

a keyboard 11 for entering instructions to the apparatus;

a pointing device 12 for giving instructions to the image information on the CRT 10, by moving a cursor on said CRT 10 in the x- and y-directions, thereby selecting a command image in the command menu or entering the coordinates of an arbitrary point of the pattern displayed on the CRT 10;

a VRAM 13 having the data to be displayed on the CRT 10 in the form of a developed bit map;

a program memory (PMEM) 6 for storing a program for the editing process, as shown in the following flow charts, selected and transferred from the rigid disk 3;

an image memory (IMEM) 14 for storing the data entered into the apparatus and processed therein, said data being released through the aforementioned output unit 8; and a bit manipulation unit (BMU) 15 capable of DMA data transfer among the VRAM 13, PMEM 6 and IMEM 14 without relying on the MPU, with additional functions such as logic calculation in the bit unit, rotation and size change of the developed pattern at said transfer.

Figures 1, 2:
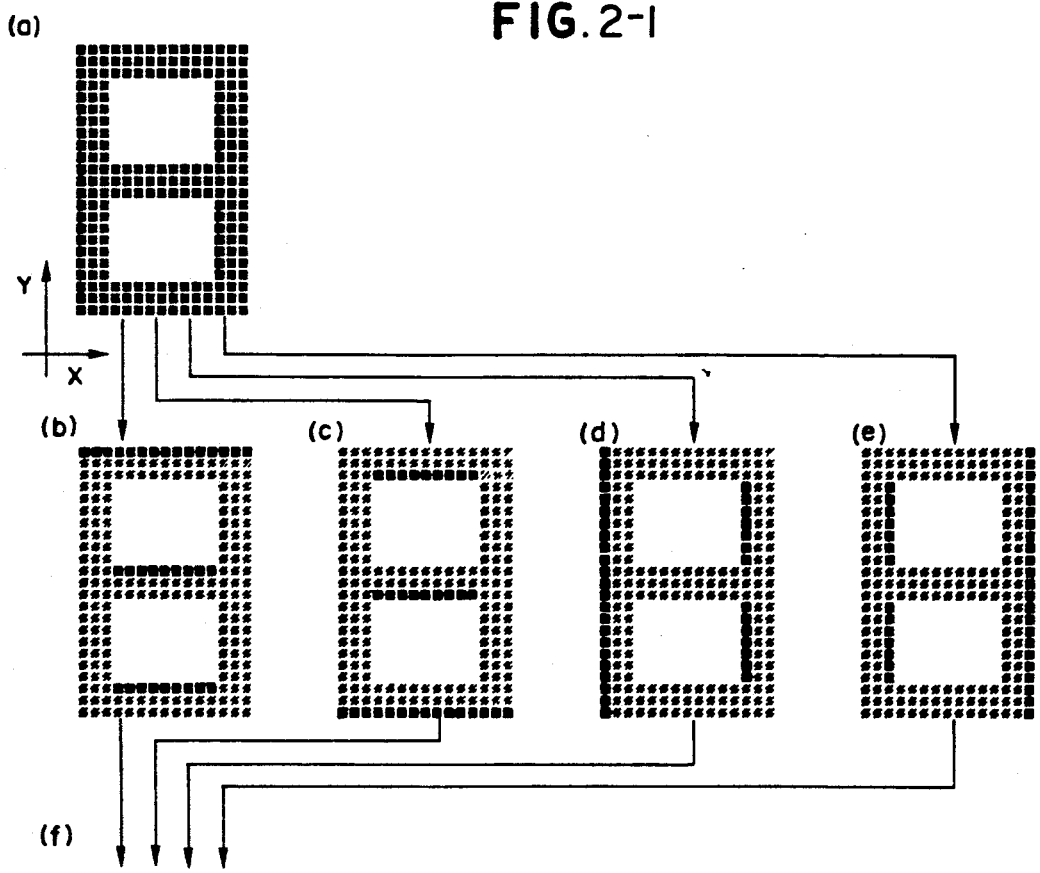

FIG. 1-2 is a block diagram of the apparatus employing the system shown in FIG. 1-1.

Graphic memories G0, G1 and G2 are assigned separately in the IMEM 14 shown in FIG. 1-1. Analog image data entered from the image input device 7 are converted into binary signals by A/D conversion and stored temporarily in the graphic memory G0. System softwares C1, C2, C3, C4, C5, C6, C7 and C8 for operating the present apparatus are transferred from the external memory shown in FIG. 1-1 in the form of programs to the PMEM 6, and are executed by the MPU 2. Memories M1, M2 for temporarily storing the point information obtained from the outline extraction part C1 and the noticed point information extracted by a noticed point extraction part C2 are assigned, when necessary, in the PMEM 6. Video display memories V0, V1 are assigned in the VRAM 13, and are switched by a display selection part C3 for display on the CRT 10.

FIG. 2-1(a) shows an example of a binary bit map image, entered from the image input device 7 and temporarily stored in the graphic memory G0.

Figures 2, 3, 4:
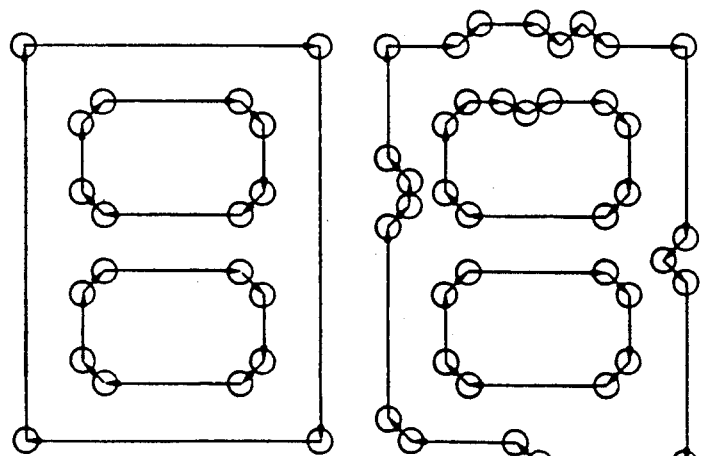
Figure 3:
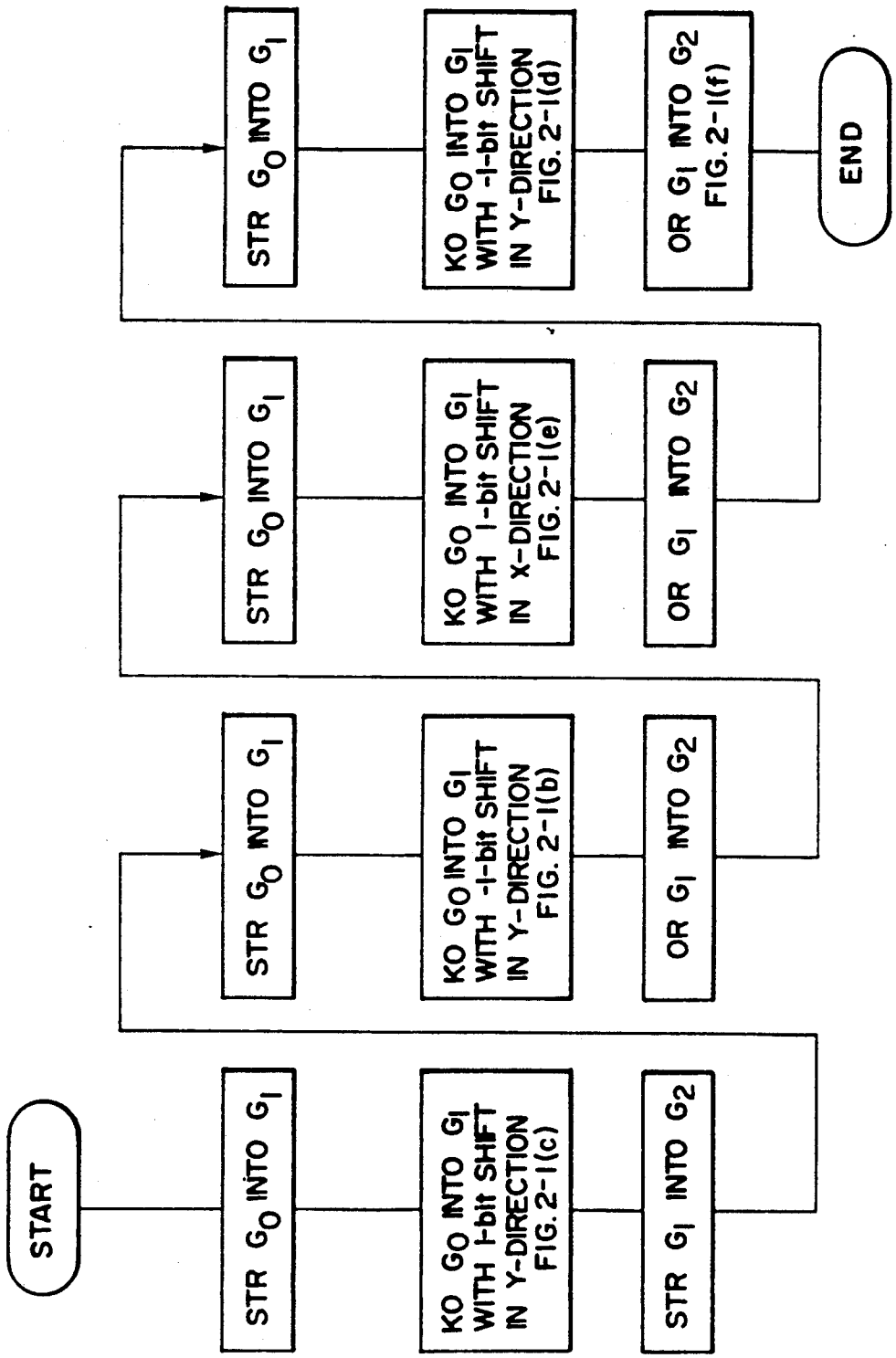

FIG. 2 and a flow chart shown in FIG. 3 show the method of extracting the bits of outline by only the outline extracting part C1. The most important feature in said method is to extract the "internal edge" of the outline of the entered bit map image 2(a), since the extraction of "external edge" of the outline will result in a range in the ratio of the image area to the non-image area of the original pattern.

FIGS. 2-1(b), (c), (d) and (e) correspond to another area G1, in the IMEM 14, of a size the same as that of the area shown in FIG. 2-1(a), and FIG. 2-1(f) corresponds to still another area G2 similarly assigned in the IMEM 14. The transfer in various steps, as shown in FIG. 3, is conducted by a block transfer in the memory, with the logic processing of a bit unit, as will be explained later, by means of the BMU 15 shown in FIG. 1-1. More specifically:

STR is D=S
KO is D=S̄ [and] D
OR is D=S [or] D wherein S is the sending memory, D is destination memory, [and] means logic product, [or] means logic sum, and $\bar{S}$ is an inverted S.

The bit map in FIG. 2-1(f) obtained by outline extraction explained above is traced by an outline tracing mask in FIG. 2-2 to obtain vector point coordinates in FIG. 2-3. A point (p) in FIG. 2-2 indicates the center point of outline tracing, and (1) to (8) indicate the order of priority for determining the next outline point in the outline tracing.

FIGS. 2-1(a) to (f) and FIG. 2-3 are reduced in size for the purpose of simplicity, but the actual bit map is larger. Also, since the entered analog image is not sharp, a linear portion is represented by a group of vector points including small noises as shown in FIG. 2-4.

The outline points determined by the above-mentioned outline extracting part C1 are stored, as a group of point coordinates, in the point coordinate memory M1.

FIGS. 4(a) and 4(b) indicate the structure of outline information and point information in the point coordinate memory M1, for storing the group of point coordinates representing the outline.

FIG. 4-1 shows outline information, "stpoly", consisting of two parts, in which "spno" is an ordinal number that represents the number of points coordinates as counted from a starting point on the outline, and "effcnt" indicates the number of elements or point coordinates constituting the graphic pattern.

FIG. 4-2 shows point information, "stdata", consisting of six items, in which "stno" is an ordinal number in the arrangement of noticed points, as will be explained in relation to FIG. 8, and has an initial value "−1". A value "pgno" indicates the outline to which the point belongs, namely an ordinal number in the outline information arrangement. A value "flag" is flag information representing the operation for shaping and simplification, to be explained later, and has an initial value "0". Data "pos" represents the coordinate of a point by (x, y). Data "prno" and "nxno" represent the connection of point information, and respectively indicate the ordinal number of point information corresponding to a preceding point, and that corresponding to the next point.

Figure 5:
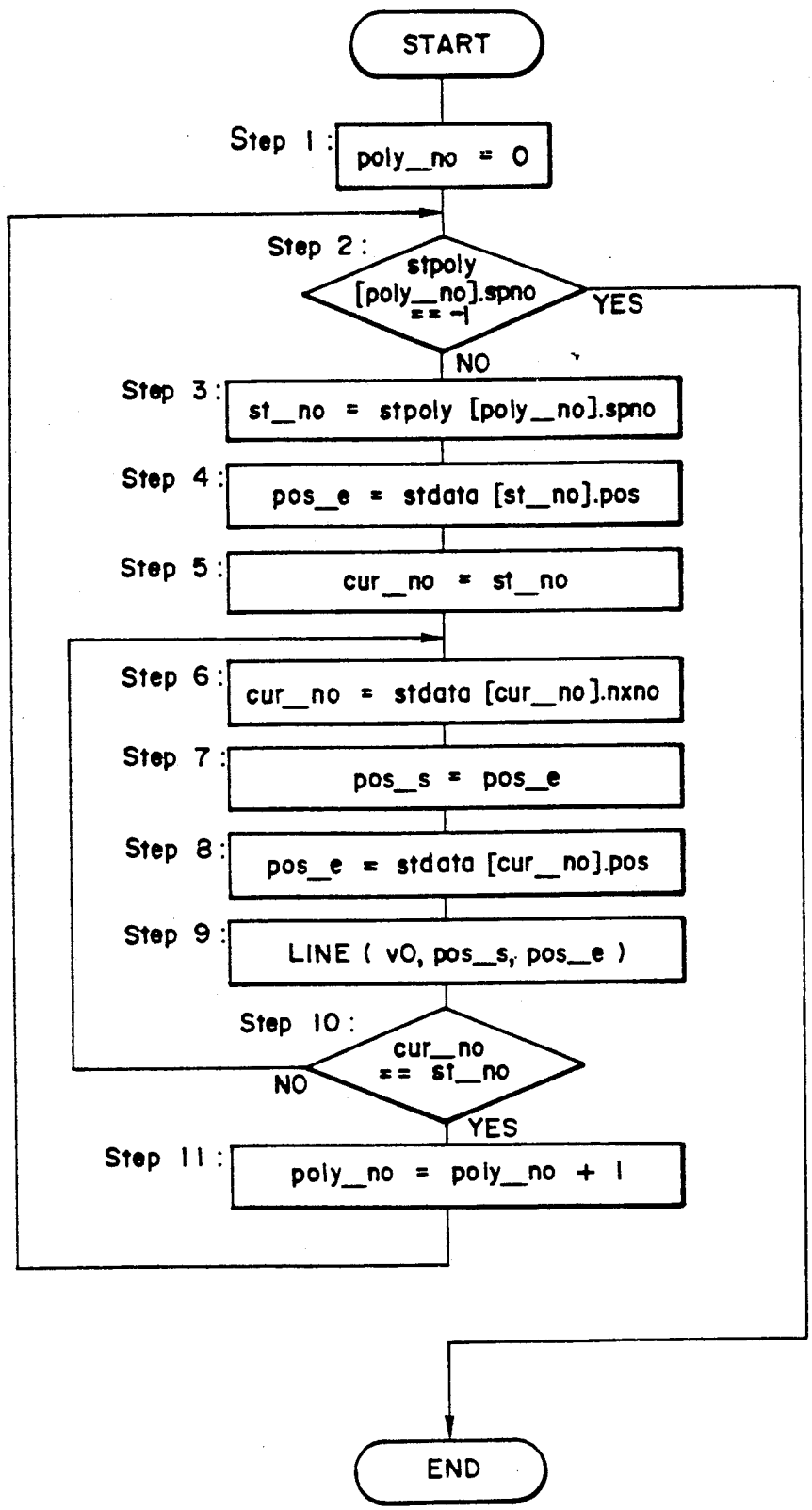

For facilitating the understanding, FIG. 4-3 shows a character pattern " " as an example, and FIGS. 4-4 and 4-5 show the corresponding outline information, "stpoly", and point information, "stdata".

FIG. 4-4 indicates that the character pattern shown in FIG. 4-3 is composed of four outlines (e.g., [0], [1], [2] and [3]. For the first outline ("stpoly"="0"), "spno" is "0" which is an ordinal number indicating the starting point, P[0], of the outline, in the series of point information, and "effcnt" is "a", indicating the number of elements or point coordinates constituting the first outline.

FIG. 4-5 indicates the point information for the character pattern shown in FIG. 4-3. For example, for the content "stdata" [0] corresponding to a point P[0], "stno" has the initial value "−1"; "pgno" is "0" indicating outline [0]; "flag" is the initial value "0"; "pos" is the coordinate (PO(x), PO(y)) of the point; "prno" has a value "a−1" indicating the preceding point; and "nxno" has a value "1" indicating the succeeding point.

Figure 9:
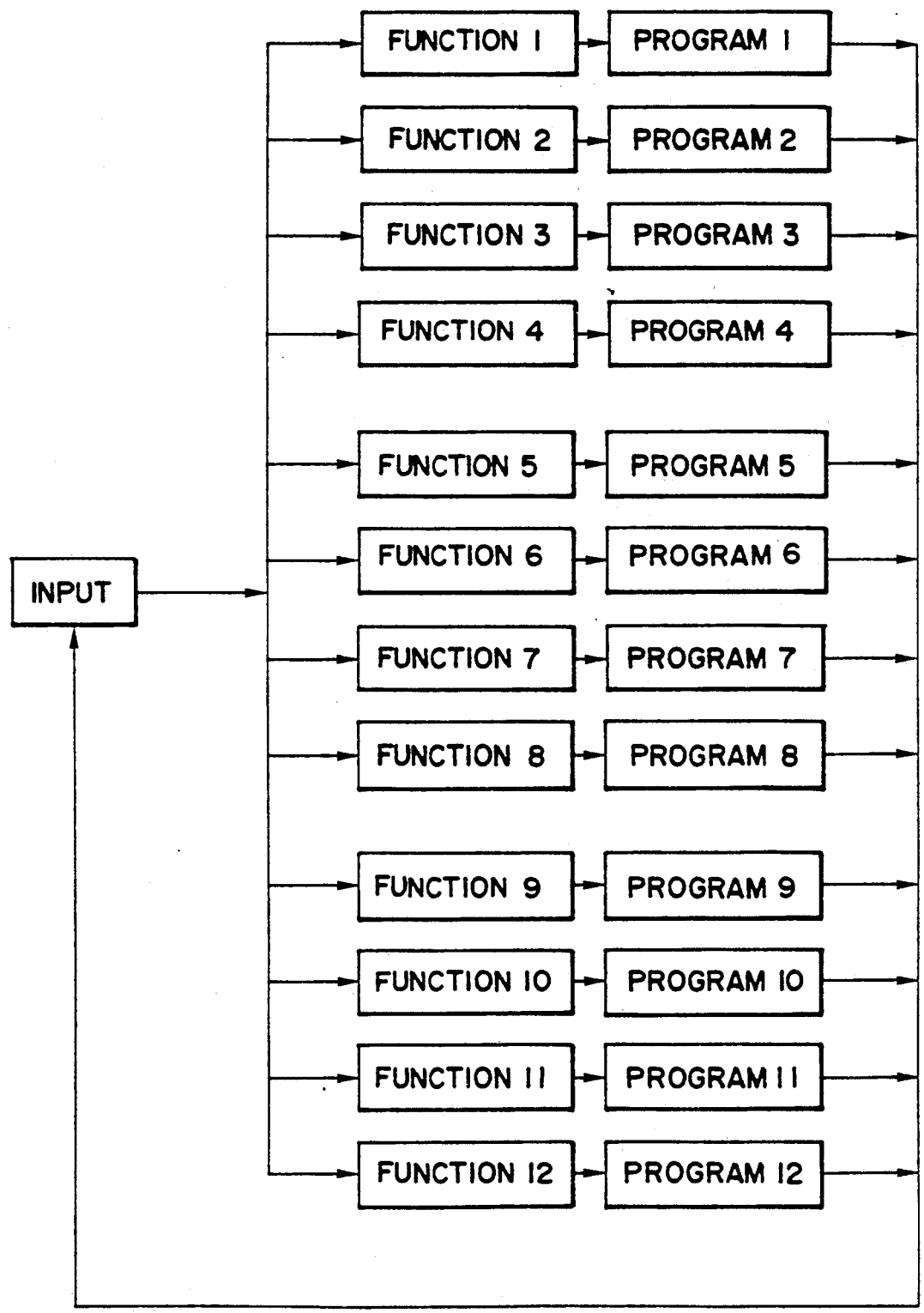
FIG. 9 is a view showing a structure for designating operations for simplification.

FIG. 9 shows the function selecting part C4 for instructing the execution of various functions of the present system and the display selecting part C3 for switching the display, and the functions can be arbitrarily selected by an input from the pointing device 12 or the keyboard 11.

In response to the entry of a function 1, a program 1 is activated to execute the corresponding command. For example, noticed point extracting part C2 assigns an additional selection to the function 1, and a new selection to the function 2. Also the function executing part C5 assigns a sectional deletion to the function 3, and an alignment to the function 6. Also the display selecting part C3 assigns an original display to the function 9, and a vector display under processing to the function 10.

Figure 6:
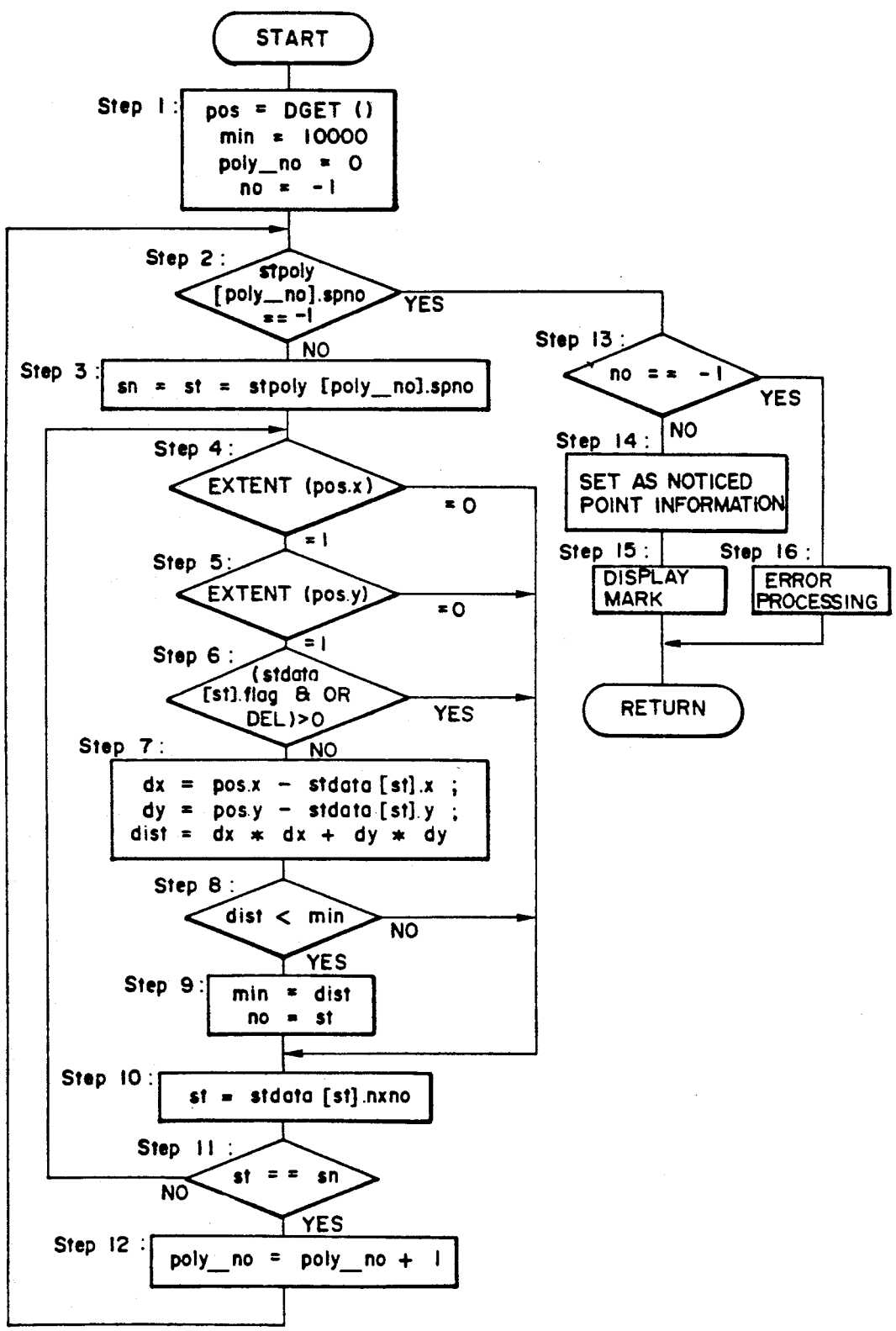
FIG. 6 is a flow chart for extracting one or plural noticed points from the group of coordinates of the points.

In response to the instruction of function 1 or 2, a program for extracting the noticed points, which is to be explained later in relation to FIG. 6, is activated, thereby extracting the noticed points in sequential order until another command is selected. The selection of function 3 allows execution of sectional deletion to be explained later in relation to FIG. 11. The selection of function 6 allows execution of the alignment to be explained later in relation to FIGS. 14 and 15, and the selection of function 9 allows the display of the group of point coordinates representing the outline as will be explained later in relation to FIG. 5. The selection of function 10 allows display, with linear lines of the group of point coordinates representing the outline and the group of noticed points correlated therewith, as will be explained later in relation to FIG. 13. The functions are executed by the function executing part C5 and the display parts C7, C8.

When the function 9 is entered in FIG. 9, the display selecting part C3 selects the original display in the first display part C7.

FIG. 5 is a flow chart showing the function of the first display part C7 for displaying the group of point coordinates representing the outline.

A step 1 sets an initial value "0" as a control variable "poly$_{13}$no" for controlling the outline to be displayed.

A step 2 discriminates the completion of the outline information shown in FIG. 4-4, and, if said information is completed, "sono"=−1, terminates the display.

Steps 3, 4 and 5 execute initialization at the starting point of each outline, by storing the ordinal number of the point information at the starting point in variables "st$_{13}$no" and "cur$_{13}$no", and the coordinate values of said starting point in a variable "pos$_{13}$e".

Steps 6, 7 and 8 initialize a line display start point "pos$_{13}$s" and a line display end point "pos$_{13}$e" as parameters for a line display function LINE used in step 9.

In said function LINE (V0, pos$_{13}$s, pos$_{13}$e), the value V0 designates the memory V0 shown in FIG. 1-2 as the display memory, and the values "pos$_{13}$s" and "pos$_{13}$e" indicate the coordinate values (x, y) on said display memory V0.

A step 10 executes repetition control, for discriminating the completion of outline display. If display is completed, step 11 increases the control variable "poly$_{13}$no" by one, and the sequence returns to step 2, but, if not completed, namely if the outline still continues, the sequence proceeds to step 6.

When function 1 or 2 is entered in FIG. 9, the noticed point extraction part C2 is activated for extracting one or more noticed points from the group of point coordinates.

FIG. 6 is a flow chart of the noticed point extracting part C2 for extracting one or more noticed points from the group of point coordinates. An operator A[B] means to take out the content of a component B in an arrangement A, and an operator A.B means to take out the content of a member B belonging to data A.

A step 1 executes initialization, by setting coordinate values, designated by the pointing device 12 at a position on the display, as a variable "pos" control variable "poly$_{13}$no" is set to "0" for controlling the order of outlines to be searched, is set at a sufficiently large value "1000" thereby indicating the distance between the "pos" and a candidate point to be extracted, and a variable "no" is initialized to "−1" to indicate the ordinal number of the noticed point to be set at the end of the present flow, in order to obtain an error value when a desired noticed point is not obtained in the present flow.

A step 2 discriminates the end of outline information shown in FIG. 4-4, and, if the outline is completed, the sequence proceeds to a step 13 to be explained later.

A step 3 executes initialization at the starting point of each outline, by storing the ordinal number of the point information of said start point in control variable "st" to control the order of point information and in variable "sn".

Steps 4 and 5 execute a function EXTENT for discriminating whether the coordinate (x, y) of the current coordinate "stdata [st].pos" and "pos" are contained within the coordinate system constituting the character pattern on the display, by comparing the distances of the components. When the result is false (=0) or true (=1), the sequence respectively proceeds to a step 10 to be explained later or to a succeeding step.

A step 6 discriminates whether the candidate point coordinate has already been deleted, and, if deleted, the sequence proceeds to step 10.

A step 7 calculates the distance between the compared coordinate "stdata[st].pos" in the arrangement of point information and the coordinate "pos" designated by the pointing device, and sets said distance as a variable "dist".

A step 8 compares said variable "min" and the variable "dist" obtained in step 7. If "dist"<"min", step 9 executes substitutions "min"="dist" and "no"="st". In this manner the variable "no" contains the ordinal number of the candidate point to be extracted at this point. Then step 10 substitutes the control variable "st" with the next ordinal number of point information, "stdata [st].nxno", and step 11 executes repetition control by discriminating whether the outline search is complete. If the outline is completed, step 12 increases the control variable "poly$_{13}$no" by one, and the sequence proceeds to step 2. If the outline still continues, the sequence proceeds to step 4.

A step 13 discriminates whether a point has been extracted in the foregoing steps. If "no" is "−1" in step 13, there is discriminated the absence of such extracted point, and a step 16 provides an alarm sound for example.

A step 14 is executed, as will be explained later in relation to FIG. 8, when a new noticed point is extracted in the present process.

Figure 7:
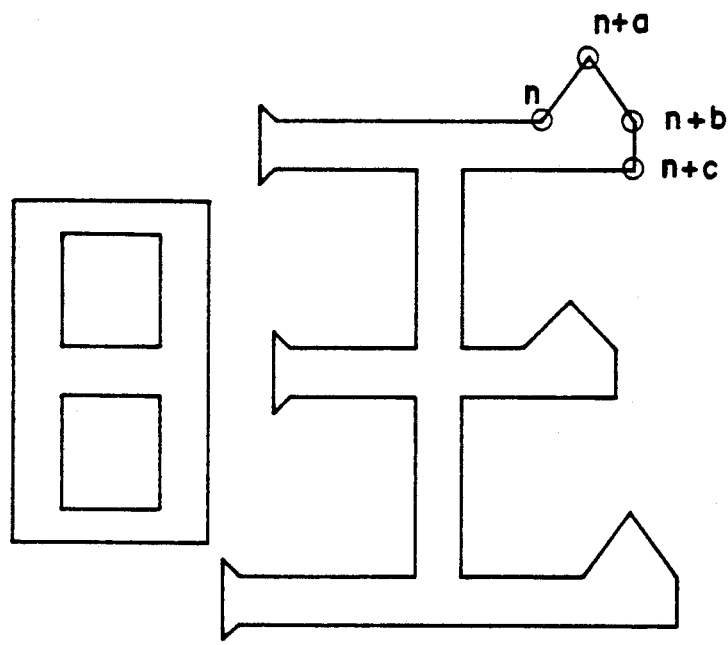
FIG. 7 is a view showing the mode of display of noticed points.

A step 15 displays the extraction of a noticed point, for example by a small circle on the display as shown in FIG. 7.

Figure 8:
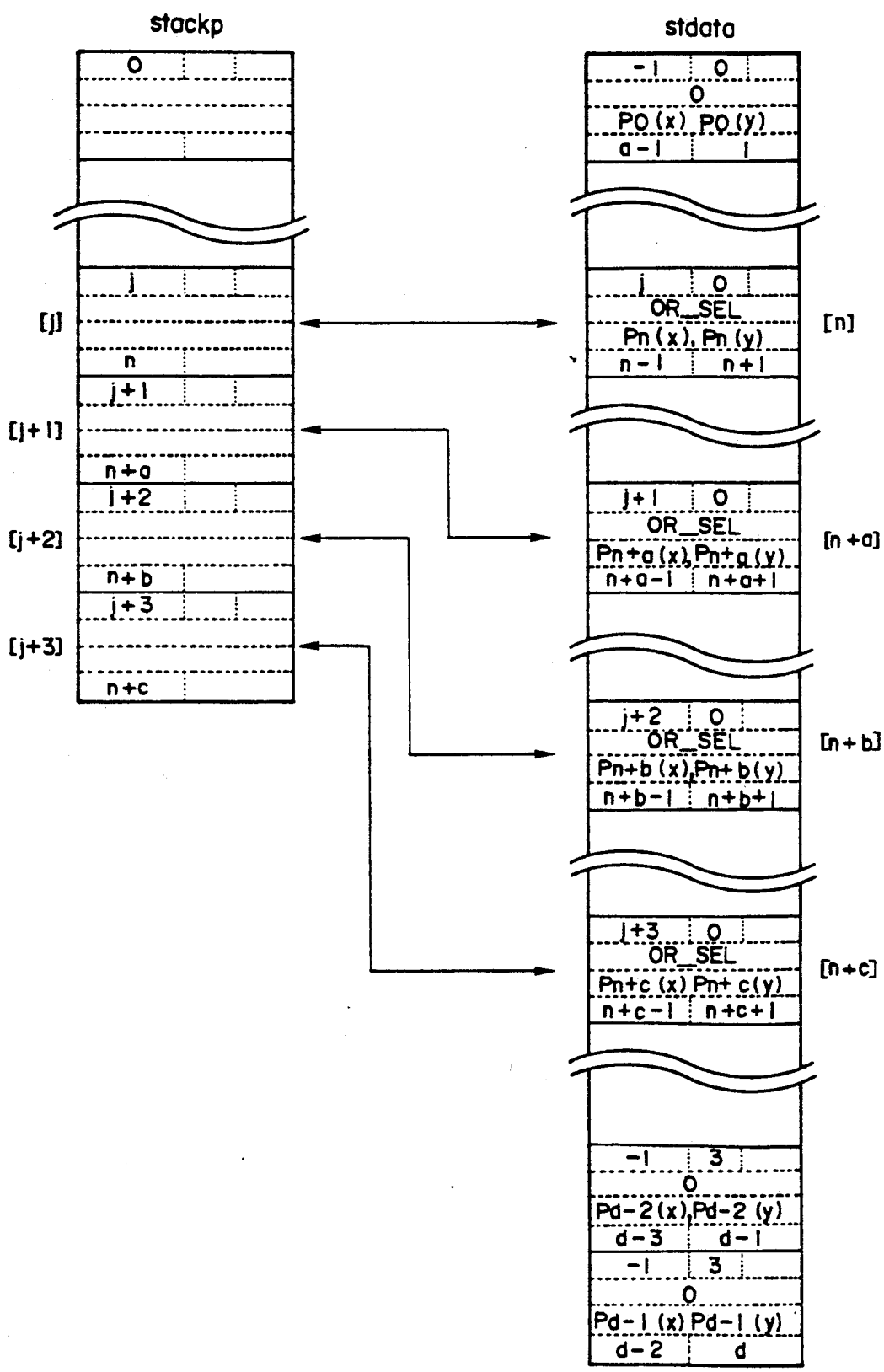
FIG. 8 is a view showing a structure for correlating the group of coordinates of the points representing the outline with the group of noticed points.

FIG. 8 shows a structure for correlating group M1 of the point coordinates representing the aforementioned character pattern " " with a group M2 of noticed points, when stdata[n], stdata[n+a], stdata[n+b], stdata[n+c] and stdata[n+d] are selected as the noticed points according to FIG. 6. Also FIG. 7 shows an example of step 15 as explained in relation to FIG. 6.

The group of noticed points is memorized with a structure similar to that of the point information explained in FIG. 4-2. However in case of the group of noticed points, "prno" indicates the ordinal number of the point information, for clarifying which elements of the point information have been extracted as the noticed points. Also, there a variable "cstcnt" indicates the number of noticed elements at this point and has an initial value "0".

When the ordinal number of the point information of a point extracted as shown in FIG. 6 is "n", and the variable "cstcnt" is "j" at this point, the point coordinate information "stdata[n]" and the noticed point information "stackp[j]" have the following contents respectively for correlating the two as shown in FIG. 8.

At noticed point j, the value "stackp[j].flag" has the value "stdata[n].flag" of the extracted point; the value "stackp[j].pos" has the value of "stdata[n].pos"; and the value "stackp[j].prno" has the ordinal number "n". Also for the point information n, the value "stdata [n].stno" has the value (=j) of the variable "cstcnt" at this point, and the value "stdata[n].flag" has a flag bit OR$_{13}$SEL indicating the extraction as a noticed point.

If an operation for shaping and simplification, to be explained later, is given to a point "stdata[n]" afterwards, the content of "stackp[j]" is renewed. Also, in order to reflect the content of the noticed points to the content of the point information, for example at the end of editing, the content of "stackp[cstcnt]" can be set at "stdata[stackp[cstcnt].prno].

Figure 10:
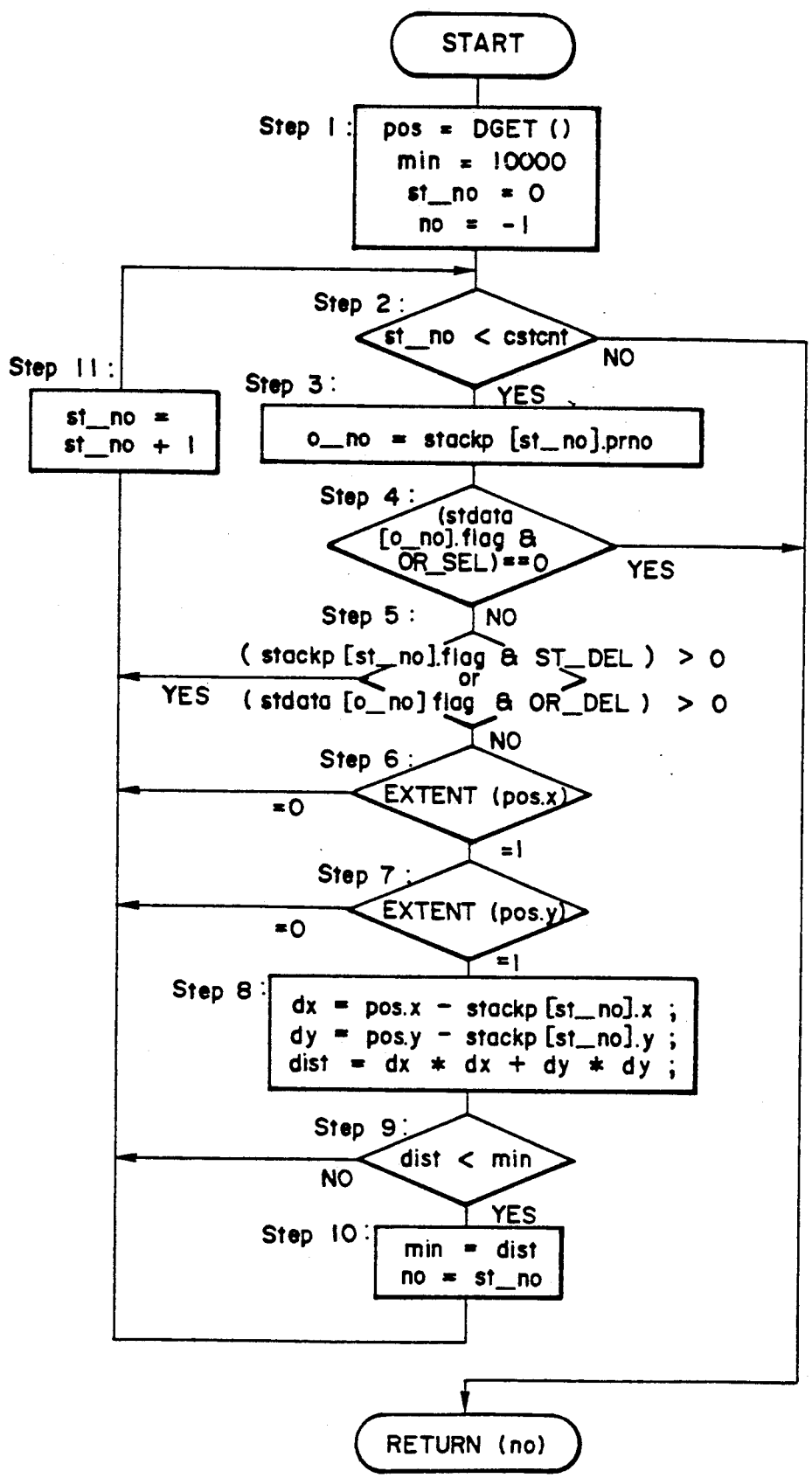
FIG. 10 is a flow chart for specifying the extent of a designated operation, from the group of noticed points.

FIG. 10 is a flow chart for specifying, from the noticed point in memory M2, a section for executing a designated operation.

A step 1 executes initialization, by setting coordinate value, designated by the pointing device as a position on the display, in variable "pos", "0" in a control variable "st$_{13}$no" for controlling the order of arrangement of noticed points to be searched, a sufficiently large value "10000" in variable "min" indicating the distance between the "pos" and a candidate coordinate for which the section is to be specified, and an initial value "−1" in variable "no" indicating the ordinal number of the noticed point to be set at the end of the present flow, in order to obtain an error value when a desired noticed point is not obtained in the present flow.

A step 2 discriminates the completion of the arrangement of noticed points under search, through comparison with the number, "cstcnt" of elements of the arrangement of noticed points.

A step 3 sets the ordinal number of the point information in the arrangement of noticed points, in variable "o$_{13}$no".

A step 4 discriminates whether the candidate point coordinate has been extracted as a noticed point, and, if not extracted, the sequence is terminated since it is inadequate.

A step 5 discriminates whether the candidate point coordinate has already been deleted, and, if deleted, the sequence proceeds to step 11 to be explained later.

Steps 6 and 7 execute a function EXTENT for discriminating whether the coordinate (x, y) of the current coordinate "stackp[st$_{13}$no].pos" and "pos" are contained within the coordinate system constituting the character pattern on the display, by comparing the distances of the components. When the result is false (=0) indicating outside, or true (=1) indicating inside, the sequence respectively proceeds to step 11 to be explained later or to a succeeding step.

A step 8 calculates the distance between the compared coordinate "stackp[st$_{13}$no].pos" in the arrangement of noticed points and the coordinate "pos", and sets said distance as a variable "dist".

A step 9 compares said variable "min" and the variable "dist" obtained in the step 8. If "dist"<"min", step 10 executes substitutions "min"="dist" and "no"="st$_1$. 3no". In this manner the variable "no" indicates the ordinal number of the noticed point for specifying the section at this point.

A step 11 increases the control variable "st$_{13}$no" by one and the sequence proceeds to step 2, until step 2 discriminates the completion of the arrangement of the noticed points.

When the function 3 is entered in FIG. 9, the function executing part C5 is activated to execute the deletion of a section.

Figure 11:
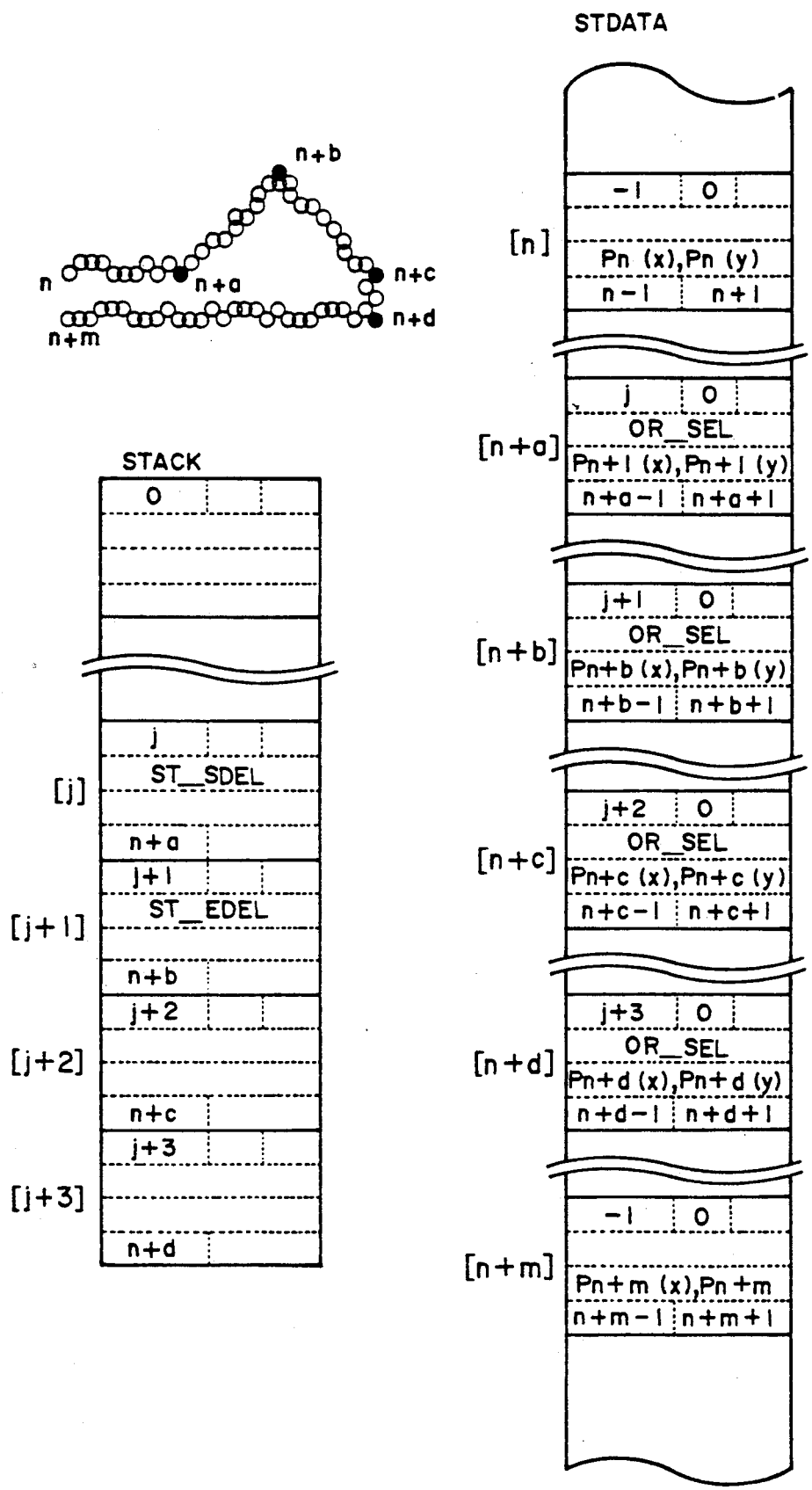
FIGS. 11 and 12 are views showing a structure for reflecting the designated operation on the group of coordinates of the points representing the outline and the group of noticed points correlated therewith.

FIG. 11 shows a structure for reflecting a designated operation on the group of point coordinates representing the outline and the group of noticed points correlated therewith.

Reference is made to FIG. 11 for explaining the operation in case of deletion of a section.

From the data from "stdata[n]" to "stdata[n+m]", noticed points "stdata[n+a]", "stdata[n+b]", "stdata[n+c]" and "stdata[n+d]" are extracted as explained in FIG. 6. The extractions can be conducted in an arbitrary order, but, for the purpose of simplicity, let us consider a case where the variable "cstcnt"="j" immediately before the extraction of four points, and where the four points are extracted in the order of "n+a", "n+b", "n+c" and "n+d". For example the extraction of the coordinate point "stdata[n+a]" and the correlation with the noticed point information "stackp[j]" are conducted in the same manner as already explained in relation to FIG. 8. Thereafter the variable "cstcnt" is increased by one, and the coordinate points "stdata[n+b]", "[n+c]" and "[n+d]" are extracted. After these operations, a value "j+4" is set as the variable "cstcnt".

Then the pointing device 12 designates an arbitrary point close to a line connecting the points n+a and n+b, and a section for executing the designated operation is specified between the preceding noticed point "stdata[n+a]" and the succeeding noticed point "stdata[n+b]" in the sequence of the point information, according to the method explained in relation to FIG. 10.

Figure 12:
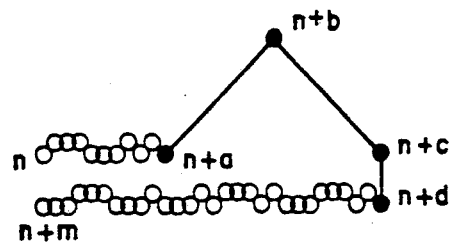
Figure 12:
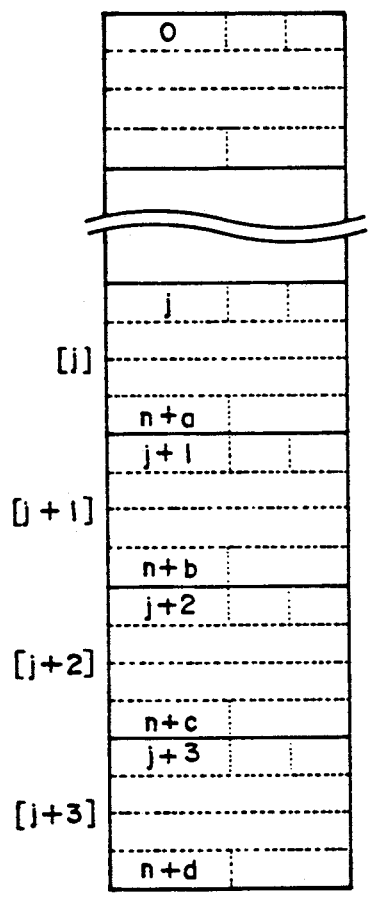
Figure 12:
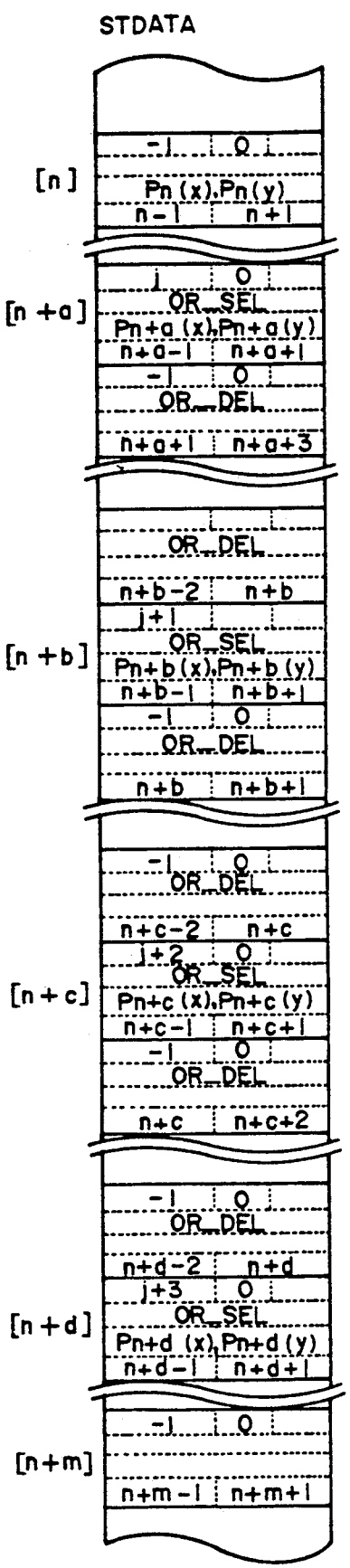

When the section is specified, the lines connecting all the point coordinates from "stdata[n+a]" to "stdata[n+b]" are erased, and a line connecting "stdata[n+a].pos" and "stdata[n+b].pos" is newly displayed. This operation can be reflected in the group "stdata" of point coordinates and the group "stackp" of noticed points in the following two steps. As the first step, a section deletion start flag ST$_{13}$SDEL is set as a flag "stackp[j].flag" for the arrangement of noticed points corresponding to "stdata[n+a]", and a section deletion end flag ST$_{13}$EDEL is set as a flag "stackp[j+1].flag" of the arrangement of noticed points corresponding to "stdata[n+b]". Then, when a new section is designated by the pointing device 12 or another command is selected by a function key, the second step deletes, as shown in FIG. 12, the section deletion start flag ST$_{13}$SDEL from the "stackp[j].flag" and the section deletion end flag ST$_{13}$EDEL from the "stackp[j+1].flag". Also a deletion flag OR$_{13}$DEL is set as flags from "stdata[n+a+1]" to "stdata[n+b−1]". Such a two-step operation is adopted in order to enable a recovery when the operator makes an error in section designation to make the operation reversible until the next operation is activated. Also the section deletion command can be selected, in succession until another command is selected and the above-explained process can be repeated when another section, for example, from "stdata[n+b]" to "stdata[n+c]" or from "stdata[n+c]" to "stdata[n+d]" as designated by the pointing device 12.

When the function 6 is entered in FIG. 9, the function executing part C5 is activated to execute alignment operation in a designated section.

Figure 14:
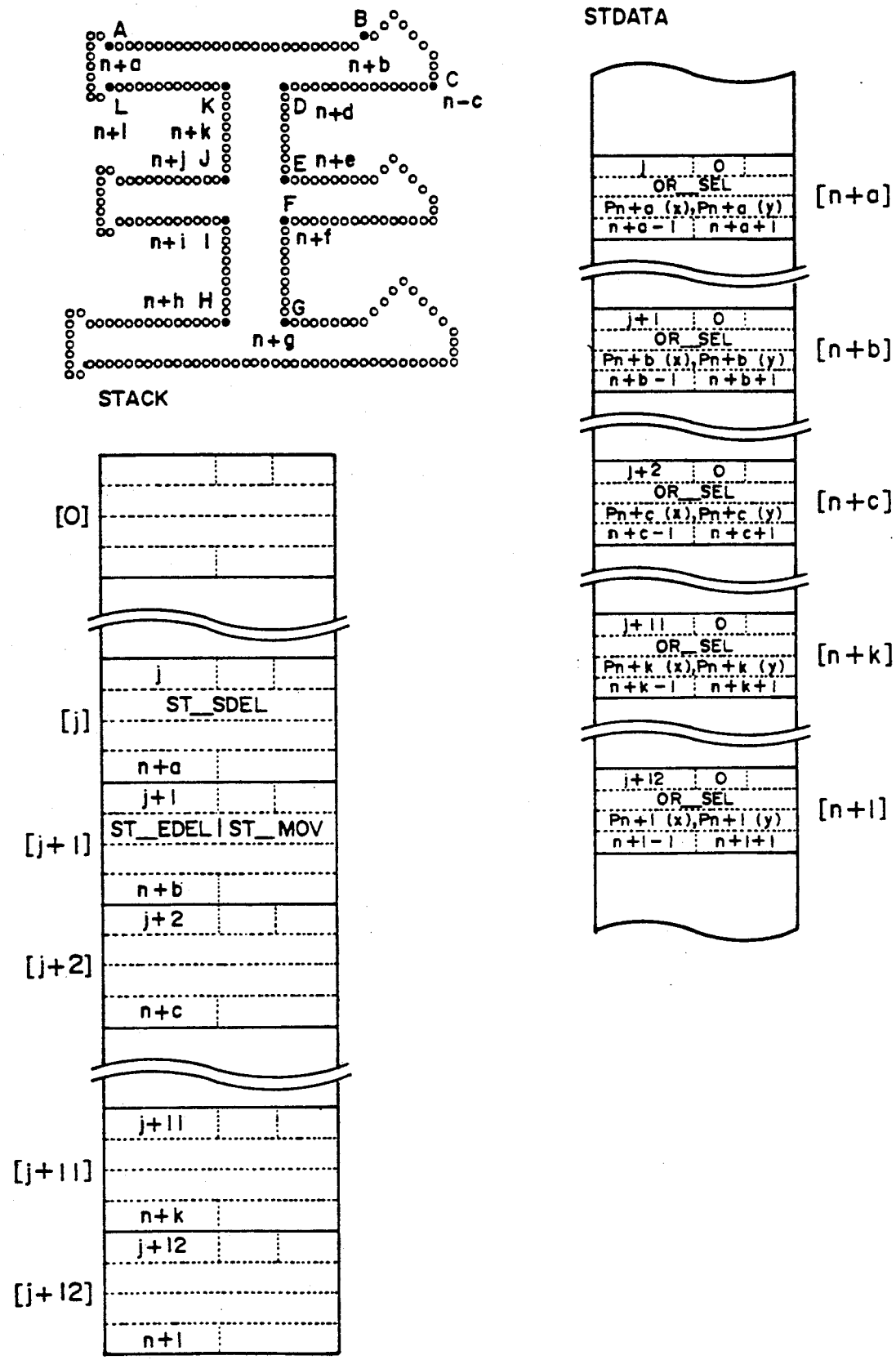
FIGS. 14 and 15 are views showing a structure for specifying the coordinate components to be modified in a designated extent.
Figure 15:
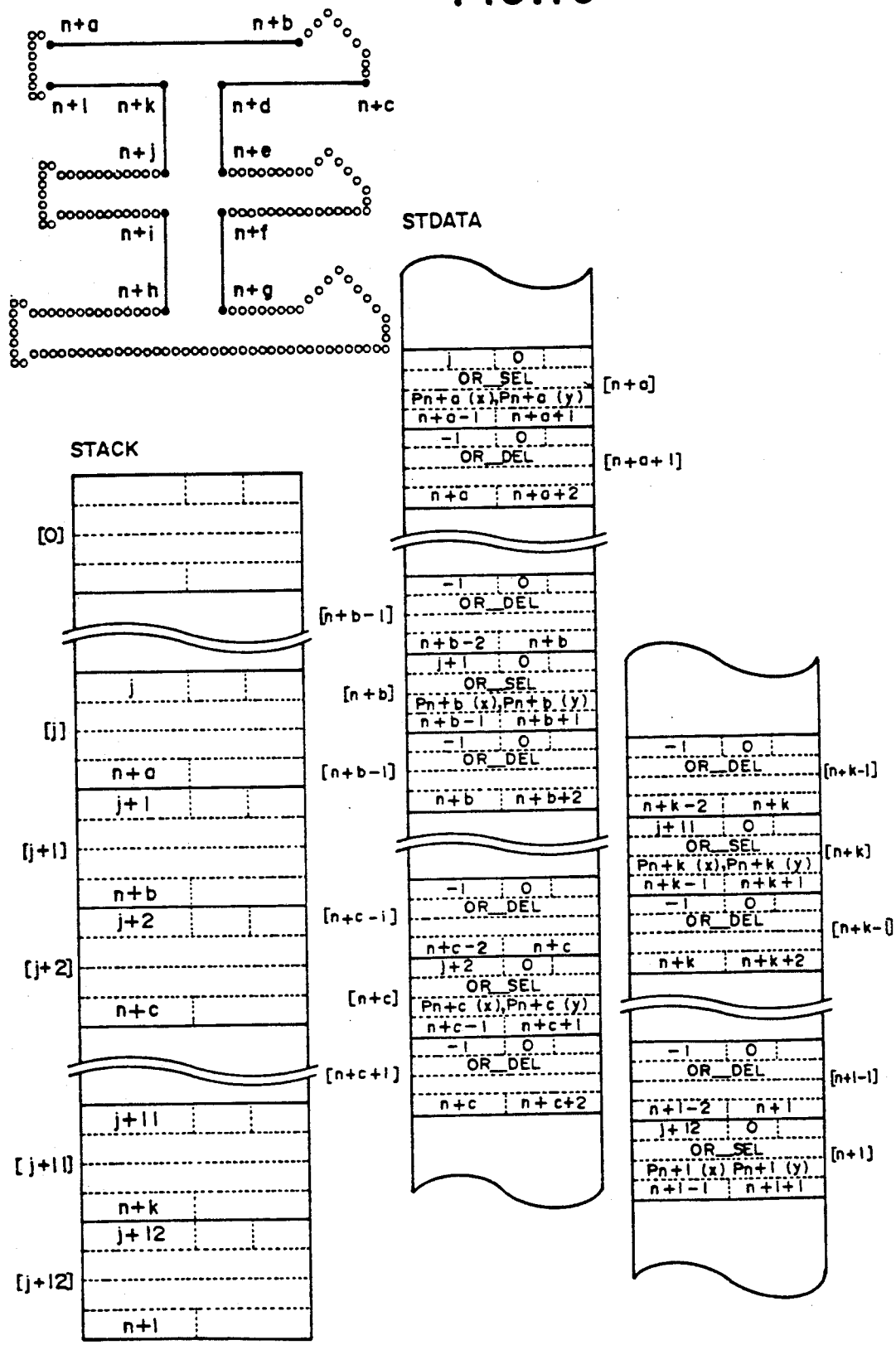

FIGS. 14 and 15 shows a structure for replacing the coordinate of the specified noticed point with the reference coordinate components, and omitting the group of all the point coordinates in said section.

In the following there will be explained an example, with respect to the points A, B, C, . . . , L in FIG. 14. for editing sections AB, CD and KL as horizontal lines of a certain thickness and sections DE, FG, HI and JK as vertical lines of a certain thickness, then aligning the sections AB, CD and KL at arbitrary y-coordinates, deleting the points on the outlines in said sections, also aligning the sections DE, FG, HI and JK at arbitrary x-coordinates and deleting the points on the outlines in said sections.

Out of the data from "stdata[n]" to "stdata[n+m]", there are extracted, for example, a point "stdata[n+a]" close to the point A, a point "stdata[n+b]" close to the point B, . . . , a point "stdata[n+1]" close to the point L according to the method explained in relation to FIG. 6. The extractions can be made in an arbitrary order, but, for the simplicity of explanation, let us consider a case in which the variable "cstcnt" is "j" prior to the extractions of the twelve points, and the twelve points are extracted in the order of "n+a", "n+b", . . . , "n+1". For example the extraction of the coordinate point "stdata[n+a]" and the correlation with the noticed point information "stackp[j]" can be made as already explained in relation to FIG. 8. After this process, the variable "cstcnt" is increased by one, and, after the extractions of the coordinate points "stdata[n+b]", . . . , "stdata[n+1]", a value "j+12" is set as the variable "cstcnt". In this state the function 6 for the alignment command is entered by the pointing device 12 or the keyboard 11, whereby the arrow cursor on the display is changed to a cross-hair cursor. Then, when an arbitrary point for example close to the section AB is designated by said cursor, there is specified, from the group of noticed points, a section from the preceding noticed point "stdata [n+a]" to the succeeding noticed point "stdata[n+b]" in the sequence of point information, according to the method shown in FIG. 10.

Figure 16:
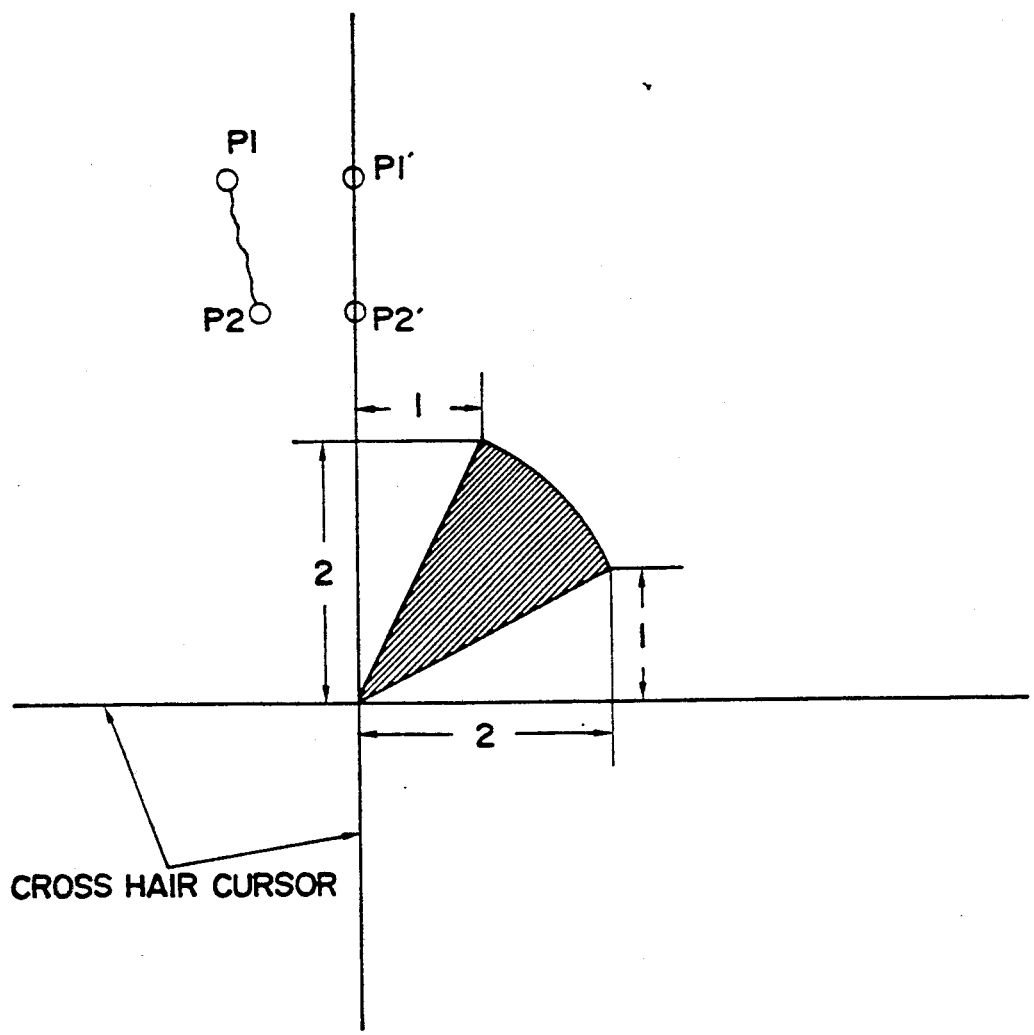
FIG. 16 is a view showing a structure for replacing the coordinates of said specified noticed point with the components of reference coordinates and omitting the group of coordinates of the points present in said extent.

However, in this process, the coordinate component to be modified is specified in the following manner. When the position of the cross-hair cursor shown in FIG. 16 is fixed as the reference coordinate and the section between P1 and P2 is specified for executing the designated operation, there are conducted calculations $slp=(p1.pos.y−P2.pos.y)/(P1.pos.x−P2.pos.x)$ and $slp=slp * slp$. A value of "slp" equal to or less than 0.25 is regarded as an alignment of the y-coordinates, and is otherwise regarded as an alignment of the x-coordinates. Consequently points P1, P2 are aligned to an x-coordinate P1', P2'. However, in an inclined section in which the value of "slp" exceeds 0.25 but does not exceed 4, no operation is conducted by this command since neither x-alignment nor y-alignment can be identified.

Thus, when a section between "stdata[n+a]" and "stdata[n+b]" is specified in FIG. 14, there are conducted calculations $slp = (stdata[n+a].pos.y - stdata[n+b].pos.y)/(stdata[n+a].pos.x - stdata[n+b].pos.x)$ and $slp = slp * slp$, and the alignment to a y-coordinate is conducted since the value of "slp" can be easily identified as smaller than 0.25. This alignment process is composed of section deletion and point displacement to be explained in FIGS. 11 and 12. Thus, as the section deletion is conducted from "stdata[n+a+1]" to "stda-ta[n+b−1]", a section deletion start flag $ST_{13}SDEL$ is set at the "stackp[j].flag", and a section deletion end flag $ST_{13}EDEL$ is set at the "stackp[j+1].flag". Then, if the value of "stdata[n+a].pos.y" of the coordinate component to be modified is different from the value of "pos.y" of the reference coordinate component, a point move flag $ST_{13}MOV$ is set at the "stackp[j].flag" and the content of the reference coordinate component "pos" is set at the "stackp[j].pos" for indicating the movement of a point, when the content of the arrangement of the noticed points is reflected in the arrangement of the point information. Said point movement is similarly conducted also for "stdata[n+b]".

This command can be selected in succession until another function is selected. Thus the content of the arrangement of the noticed points is reflected on the arrangement of the point information when the next section is specified or when another function is entered. This operation is similar to the section deletion explained in FIGS. 11 and 12. However, in the point movement, the value of "stackp[j].pos" is set at "stdata[n+a].pos", and the point move flag $ST_{13}MOV$ is erased from the "stackp[j].flag". FIG. 15 shows the reflected result.

Even when the reference coordinate is fixed by the cross-hair cursor, fine adjustments can be made by a dot movement in the vertical and horizontal directions, utilizing the arrow keys on the keyboard 11. In this case the amount of movement of the cursor from the reference position is displayed at a predetermined position on the display. It is therefore possible to determine the thickness of the linear portion of the character pattern by moving the section AB, after alignment, to the section CD by means of the arrow keys, thus calculating "stdata[n+c].pos.y" − "stdata[n+b].pos.y". It is thus rendered possible to obtain uniform thickness in the alignment of other lines.

The foregoing operations can be similarly applied to sections other than AB.

When the function 10 is entered in FIG. 9, the display selecting part C3 selects the vector display under editing by the second display part C8.

Figure 13:
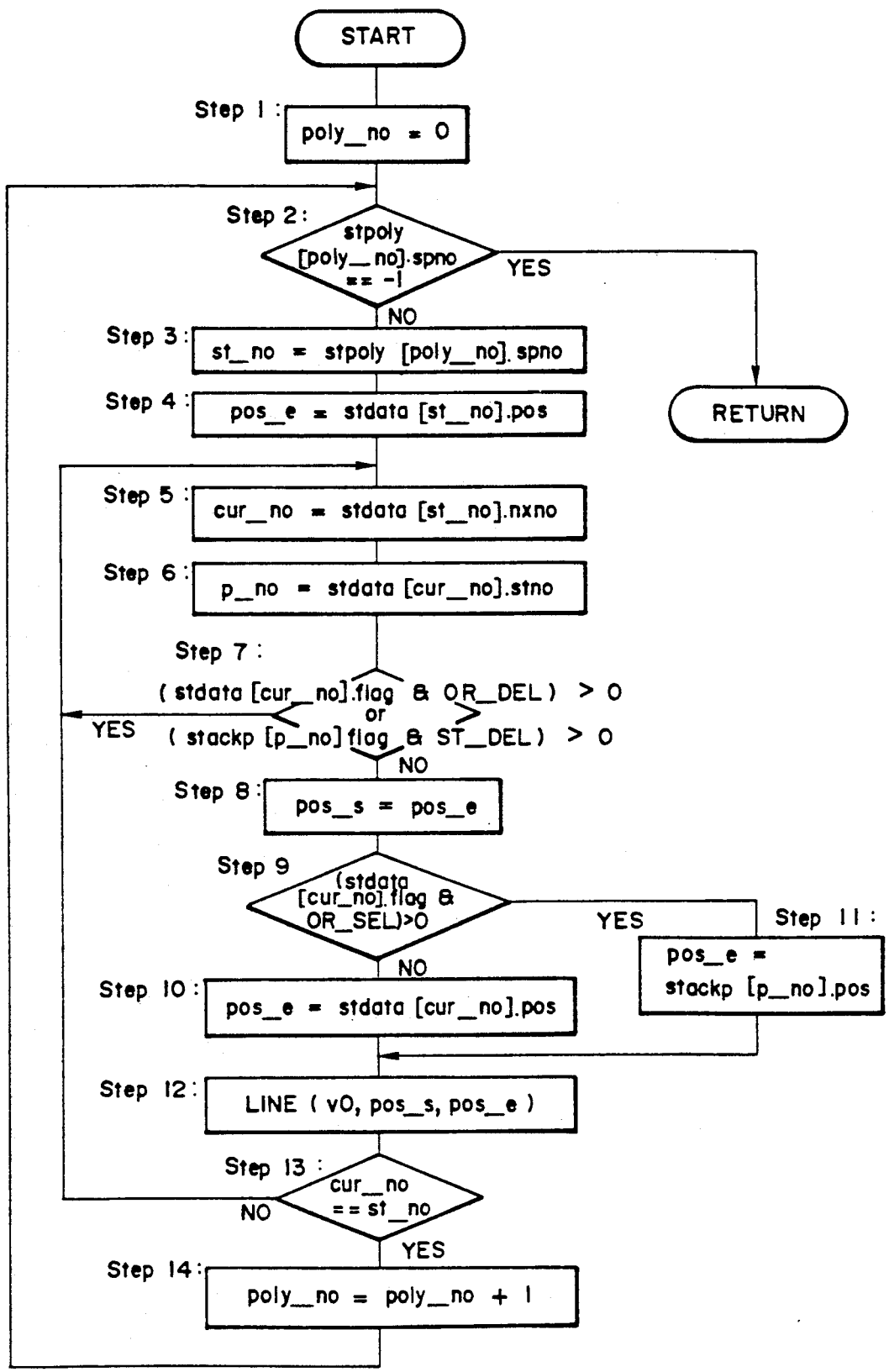
FIG. 13 is a flow chart for displaying, with linear lines, the group of coordinates of the points representing the outline and the group of noticed points correlated therewith.

FIG. 13 is a flow chart showing the function of the display part for displaying, with linear lines, the group of point coordinates representing the outline and the group of noticed points correlated therewith.

A step 1 sets an initial value "0" at a control variable "poly$_{13}$no" for controlling the order of display of the outlines.

A step 2 discriminates the completion of the outline information shown in FIG. 4-4, and, if said information is completed, the display is terminated.

Steps 3 and 4 execute initialization at the start point of each outline, by setting the ordinal number of the start point of the outline in the arrangement of point information as a variable "st$_1$3no", and the coordinate of said start point as a variable "pos$_{13}$e".

Steps 5 and 6 set "stdata[st$_1$3no].nxno" as the ordinal number of the point information at the variable "cur$_1$.3no" and "stdatas[cur$_{13}$no].stno" as the ordinal number of the noticed points at the variable "p$_{13}$no", in order to discriminate, in a step 7, whether the point coordinate representing a line has been deleted.

A step 7 executes said discrimination, and, if said point coordinate is identified to have been deleted, by the setting of a deletion flag $OR_{13}DEL$ or $ST_{13}DEL$, the sequence proceeds to step 5. If it has not been deleted, a step 8 sets a line display start point "pos$_{13}$s" as a parameter of a line display function LINE to be used in step 12. In said function LINE (V0, pos$_{13}$s, pos$_{13}$e), the value V0 specifies the destination, including the address of a graphic memory (for example VRAM 13 in FIG. 1-1), while the values "pos$_{13}$s" and "pos$_{13}$e" represent coordinates (x, y) on said graphic memory.

A step 9 discriminates whether the line display end point has been extracted as a noticed point, and, if extracted, step 11 sets "stackp[p$_{13}$no].pos" as the variable "pos$_{13}$e", or, if not, step 10 sets "stdata[cur$_{13}$no].pos".

A step 12 displays a line, utilizing the values "pos$_{13}$s" and "pos$_{13}$e" thus obtained.

A step 13 executes repetition control by discriminating the end of the displayed outline. If the outline is completed, a step 14 increases the control variable "poly$_{13}$no" by one and the sequence proceeds to step 2, but, if the outline still continues, the sequence proceeds to step 5.

When the function 9 or 10 is entered in FIG. 9, the display selecting part C3 is activated to select the original image display by the first display part C7 for the function 9, or the vector display of the pattern under editing by the second display part C8 for the function 10.

The first display part C7 displays the information of the point information memory M1 in the display memory V0, according to a flow chart the same as that shown in FIG. 5. Also the second display part C8 displays the information of the noticed point memory M2 in the display memory V1, according to a flow chart the same as that shown in FIG. 13.

Also said display selecting part C3 switches the VRAM 13 used for display, thereby independently selecting the display or non-display of the original pattern and the display or non-display of the vector image under editing.

This command enables easy comparison of the pattern under editing with the original pattern, thus allowing the editing of the character or graphic pattern into a form close to the original pattern.

Other embodiments

The image input reader 7 shown in FIG. 1-1 is not limited, as long as it can convert the original analog pattern into digital form. Also, in the foregoing embodiment, the point coordinates on the outline are extracted from a pattern subjected to A/D conversion by the image input reader, but there may be employed bit map data originally prepared from digital data. More specifically, the editing of the present invention may be applied to a pattern prepared with the digital pattern editing function of a work station or equipment constituting the present apparatus.

The display memory 13 and the display part 10 are not limited to a VRAM or a bit map display. For example, there may be employed a raster scanning display responding to commands or an accumulating display, not provided with VRAM. The pointing device may be composed of a light pen, or may be dispensed with if it can be replaced by the keyboard. The BMU 15 need not be particular hardware but can be composed of memory transfer means controlled by software. As explained in the foregoing, the components of the foregoing embodiment are prepared, in most part, for achieving high-speed operation in the present apparatus, and they can be replaced by less expensive devices or entirely dispensed with.

As explained in the foregoing, the present invention obtains the edges of an original pattern by extracting the "internal edge (boundary of image area)" thereof without varying the ratio of the image area to the non-image area of the original pattern, through formation of a logic product of the original pattern and the inverted patterns of the patterns obtained by shifting the original pattern by a dot in the vertical and horizontal direction.

Also, as explained in the foregoing, the present invention allows display, not only of the data under editing but also the original data, thereby allowing the operator to identify the fidelity of the data under editing with respect to the original data and improving the efficiency of the editing operation.

Furthermore, the present invention provides a graphic editing system provided with memory means for storing a group of point coordinates representing the outline, display means for displaying said group of point coordinates, extraction means for extracting plural noticed points from said group of point coordinates, and means for correlating said group of point coordinates representing the outline with said group of noticed points.

Also the present invention provides a graphic editing system not relying on the point coordinate values on the outline with limited precision but relies on the connection of points or the form of the outline, thereby enabling it to immediately start a final editing after the automatic pattern input and A/D conversion.

We claim:

1. A graphic editing system comprising:
   memory means for storing an image pattern composed of dot data;
   first logic product means for forming the logic product of the image pattern stored in said memory means and an inverted image pattern formed from an image pattern obtained by moving the first-mentioned image pattern by a dot upwards;
   second logic product means for forming the logic product of the image pattern stored in said memory means and an inverted image pattern formed from an image pattern obtained by moving the first-mentioned image pattern by a dot downwards;
   third logic product means for forming the logic product of the image pattern stored in said memory means and an inverted image pattern formed from an image pattern obtained by moving the first-mentioned image pattern by a dot rightwards;
   fourth logic product means for forming the logic product of the image pattern stored in said memory means and an inverted image pattern formed from an image pattern obtained by moving the first-mentioned image pattern by a dot leftwards;
   logic sum means for forming an image pattern having the logic sum of the logic products obtained by said first, second, third and fourth logic product means; and
   means for obtaining vector coordinate information and attribute information from the image pattern obtained by said logic sum means.

2. A graphic editing system according to claim 1, wherein said image pattern contains at least a graphic pattern having a width of two dots or larger.

3. A graphic editing system comprising:
   means for extracting plural noticed points from a group of original point coordinates and storing the noticed points as a group;
   specifying means for specifying a section for an editing operation, from the group of noticed points;
   means for performing the editing operation on the group of noticed points specified by said specifying means to produce a group of point coordinates representing an outline; and
   means for determining whether the group of original point coordinates and the group of point coordinates subjected to the editing operation that represent the outline are to be displayed together and for displaying them.

4. A graphic editing system according to claim 3, wherein the editing operation includes a deletion of points in a section specified by said specifying means.

5. A graphic editing system comprising:
   memory means for storing a group of point coordinates representing an outline;
   display means for displaying the group of point coordinates;
   extraction means for extracting plural noticed points from the group of point coordinates; and
   means for correlating the group of point coordinates representing the outline with the plural noticed points.

6. A graphic editing system according to claim 5, wherein said display means only displays the noticed points extracted by said extraction means.

7. A method for editing graphic images comprising the steps of:
   storing in memory an image pattern composed of dot data;
   forming the logic product of said image pattern stored in memory and an inverted image pattern formed from an image pattern obtained by moving the first-mentioned image pattern by a dot upwards;
   forming the logic product of said image pattern stored in memory and an inverted image pattern formed from an image pattern obtained by moving the first-mentioned image pattern by a dot downwards;
   forming the logic product of said image pattern stored in memory and an inverted image pattern formed from an image pattern obtained by moving the first-mentioned image pattern by a dot rightwards;
   forming the logic product of said image pattern stored in memory and an inverted image pattern formed from an image pattern obtained by moving the first-mentioned image pattern by a dot leftwards;
   forming an image pattern having the logic sum of the logic products of said image pattern stored in memory and the inverted image patterns formed from image patterns obtained by moving the first-mentioned image pattern by a dot upwards, by a dot downwards, by a dot rightwards and by a dot leftwards; and obtaining vector coordinate information and attribute information from the logic sum image pattern.

8. A method for editing graphic images according to claim 7, wherein the logic sum image pattern contains at least a graphic pattern having a width of two dots or larger.

9. A method for editing graphic images comprising the steps of:
- extracting plural noticed points from a group of original point coordinates and storing the noticed points as a group;
- specifying a section from the group of noticed points for an editing operation;
- performing the editing operation on the specified section of the group of noticed points to produce a group of point coordinates representing an outline; and
- determining whether the group of original point coordinates and the group of point coordinates subjected to the editing operation that represent the outline are to be displayed together and for displaying them.

10. A method for editing graphic images according to claim 9, wherein the editing operation includes deleting points in the section specified for the editing operation.

11. A method for editing graphic images comprising the steps of:
- storing a group of point coordinates representing an outline;
- displaying the group of point coordinates;
- extracting plural noticed points from the group of point coordinates; and
- correlating the group of point coordinates representing the outline with the plural noticed points.

12. A method for editing graphic images according to claim 11, wherein only the extracted plural noticed points are displayed.

* * * * *

UNITED STATES PATENT AND TRADEMARK OFFICE
CERTIFICATE OF CORRECTION

PATENT NO. : 5,073,957
DATED : December 17, 1991
INVENTOR(S) : KUNIO SETO ET AL.      Page 1 of 4

It is certified that error appears in the above-identified patent and that said Letters Patent is hereby corrected as shown below:

COLUMN 1

Line 5, "o" should read --of--.

COLUMN 2

Line 24, "character " "" should read --character "を"--.
Line 35, "analyzied," should read --analyzed,--.

COLUMN 5

Line 47, "character pattern " "" should read
--character pattern "我"--.

COLUMN 6

Line 38, ""poly$_{13}$no"" should read --"poly_no"--.
Line 41, ""sono"=-1," should read --"spno"=-1,--.
Line 45, ""st$_{13}$no" and "cur$_{13}$no"," should read
--"st_no" and "cur_no",--.
Line 46, ""pos$_{13}$e"." should read --"pos_e".--.
Line 48, ""pos$_{13}$s"" should read --"pos_s"-- and
""pos$_{13}$e"" should read --"pos_e"--.
Line 50, "(VO,pos$_{13}$s,pos$_{13}$e)," should read
--(VO,pos_s,pos_e),--.
Line 52, ""pos$_{13}$s" and "pos$_{13}$e"" should read
--"pos_s" and "pos_e"--.
Line 57, ""poly$_{13}$no"" should read --"poly_no"--.

UNITED STATES PATENT AND TRADEMARK OFFICE
CERTIFICATE OF CORRECTION

PATENT NO. : 5,073,957

DATED : December 17, 1991

INVENTOR(S) : KUNIO SETO ET AL.                    Page 2 of 4

It is certified that error appears in the above-identified patent and that said Letters Patent is hereby corrected as shown below:

COLUMN 7

Line 6, ""$poly_{13}no$"" should read --"poly_no"--.
Line 48, ""$poly_{13}no$"" should read --"poly_no"--.
Line 64, "character pattern " "" should read
--character pattern "氏 "--.

COLUMN 8

Line 7, "there" should be deleted.
Line 22, "$OR_{13}SEL$" should read --OR_SEL--.
Line 37, ""$st_{13}no$"" should read --"st_no"--.
Line 52, ""$o_{13}no$"" should read --"o_no"--.
Line 62, ""$stackp[st_{13}no].pos$"" should read
--"stackp[st_no].pos"--.

COLUMN 9

Line 7, ""no"="$st_{1\_}$" should read --"no"="st_no".--.
Line 8, "3no"." should be deleted.
Line 11, ""$st_{13}no$"" should read --"st_no"--.
Line 55, "$ST_{13}SDEL$" should read --ST_SDEL--.
Line 58, "$ST_{13}EDEL$" should read --ST_EDEL--.
Line 64, "$ST_{13}SDEL$" should read --ST_SDEL--.
Line 65, "$ST_{13}EDEL$" should read --ST_EDEL--.
Line 66, "$OR_{13}DEL$" should read --OR_DEL--.

UNITED STATES PATENT AND TRADEMARK OFFICE
CERTIFICATE OF CORRECTION

PATENT NO. : 5,073,957

DATED : December 17, 1991

INVENTOR(S) : KUNIO SETO ET AL.

Page 3 of 4

It is certified that error appears in the above-identified patent and that said Letters Patent is hereby corrected as shown below:

COLUMN 11

Line 11, "$ST_{13}SDEL$" should read --ST_SDEL--.
Line 13, "$ST_{13}EDEL$" should read --ST_EDEL--.
Line 17, "$ST_{13}MOV$" should read --ST_MOV--.
Line 32, "$ST_{13}MOV$" should read --ST_MOV--.
Line 59, ""$poly_{13}no$"" should read --"poly_no"--.
Line 67, ""$st_{13}no$","  should read --"st_no",--,
Line 68, ""pos13e"." should read --"pos_e".--.

COLUMN 12

Line 2, ""$cur_1$_" should read --"cur_no"--.
Line 3, "3no"" should be deleted and ""$stdatas[cur_{13}no].stno$"" should read --"stdatas[cur_no].stno"--.
Line 4, ""$p_{13}no$"," should read --"p_no",--,
Line 9, "$OR_{13}DEL$ or $ST_{13}DEL$," should read --OR_DEL or ST_DEL,--.
Line 16, ""$pos_{13}s$" and "$pos_{13}e$"" should read --"pos_s" and "pos_e"--.
Line 20, ""$stackp[p_{13}no].pos$"" should read --"stackp[p_no].pos"--.
Line 21, ""$pos_{13}e$"," should read --"pos_e",-- and ""$stdata[cur_{13}no].pos$"." should read --"stdata[cur_no].pos".--.
Line 22, ""$pos_{13}s$"" should read --"pos_s"--.
Line 23, ""$pos_{13}e$"" should read --"pos_e"--.
Line 27, "$ly_{13}no$"" should read --ly_no"--.

UNITED STATES PATENT AND TRADEMARK OFFICE
CERTIFICATE OF CORRECTION

PATENT NO. : 5,073,957
DATED : December 17, 19891
INVENTOR(S) : KUNIO SETO, etal It is certified that error appears in the above-identified patent and that said Letters Patent is hereby corrected as shown below:

Line 1, " "stdata[st$_{13}$no].nxno" " should read --"stdata[st_no].nxno"--.

Line 13, "(VO, pos$_{13}$5, pos$_{13}$e)" should read --(VO, pos-s, pos-e)--.

Signed and Sealed this

Twentieth Day of July, 1993

Attest:

MICHAEL K. KIRK

*Attesting Officer*      *Acting Commissioner of Patents and Trademarks*